United States Patent [19]

Koike et al.

[11] Patent Number: 5,745,206
[45] Date of Patent: Apr. 28, 1998

[54] LIQUID CRYSTAL DISPLAY PANEL WITH ALIGNMENT DIVISION AND SMALLER TWIST ANGLE

[75] Inventors: Yoshio Koike; Syun Tsuyuki; Katsufumi Ohmuro; Tsuyoshi Kamada, all of Kawasaki, Japan

[73] Assignee: Fujitsu Limited, Kawasaki, Japan

[21] Appl. No.: 827,771

[22] Filed: Apr. 11, 1997

Related U.S. Application Data

[63] Continuation of Ser. No. 331,759, Oct. 31, 1994, abandoned.

[30] Foreign Application Priority Data

Feb. 18, 1994 [JP] Japan ................................. 6-021555
Aug. 3, 1994 [JP] Japan ................................. 6-182409

[51] Int. Cl.$^6$ .................... G02F 1/1337; G02F 1/1335; C09K 19/02
[52] U.S. Cl. ................ 349/129; 349/181; 349/117
[58] Field of Search ....................... 359/73, 75, 76, 359/77, 78; 349/129, 181, 117

[56] References Cited

U.S. PATENT DOCUMENTS

| | | | |
|---|---|---|---|
| 4,398,803 | 8/1983 | Pohl et al. | 350/334 |
| 4,878,742 | 11/1989 | Ohkubo et al. | 359/77 |
| 4,896,947 | 1/1990 | Leenhouts | 350/337 |
| 4,930,877 | 6/1990 | Kano et al. | 359/63 |
| 5,004,324 | 4/1991 | Leenhouts et al. | 359/78 |
| 5,091,794 | 2/1992 | Suzuki | 359/77 |
| 5,446,569 | 8/1995 | Iwai et al. | 359/76 |
| 5,473,455 | 12/1995 | Koike et al. | 359/76 |

FOREIGN PATENT DOCUMENTS

| | | | |
|---|---|---|---|
| 20549283 | 12/1992 | European Pat. Off. | |
| 2705399 | 8/1977 | Germany | 359/78 |
| 54-5754 | 1/1979 | Japan . | |
| 63-106624 | 5/1988 | Japan . | |
| 63-115137 | 5/1988 | Japan . | |
| 63-121814 | 5/1988 | Japan | 359/78 |
| 5-19304 | 1/1993 | Japan . | |
| 6-43452 | 2/1994 | Japan . | |

*Primary Examiner*—William L. Sikes
*Assistant Examiner*—Tiep H. Nguyen
*Attorney, Agent, or Firm*—Greer, Burns & Crain, Ltd.

[57] ABSTRACT

The liquid crystal display panel comprising a twisted nematic liquid crystal inserted between a pair of substrates having alignment films, respectively. The liquid crystal twists from one substrate to the other substrate at a predetermined twist angle which is greater than zero degrees but smaller than 90 degrees. A polarizer and an analyzer are arranged crosswise. The alignment films are divided into minute regions so that the liquid crystal molecules in one of the regions align in one direction and the liquid crystal molecules in the other region align in another direction. The product ($\Delta nd$) of the anisotropy of the refractive index ($\Delta n$) and the layer thickness (d) of the liquid crystal is smaller than approximately 0.5 µm and ensures a linearly polarized light incident onto the liquid crystal rotates approximately 90 degrees before the light emerges from the liquid crystal.

16 Claims, 29 Drawing Sheets

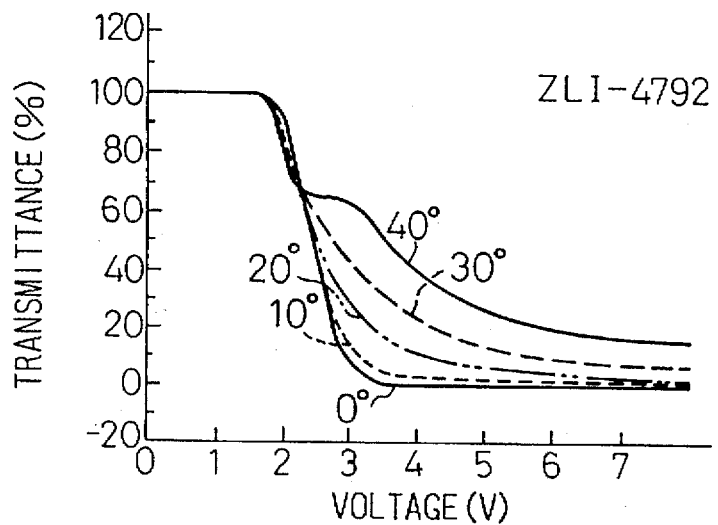
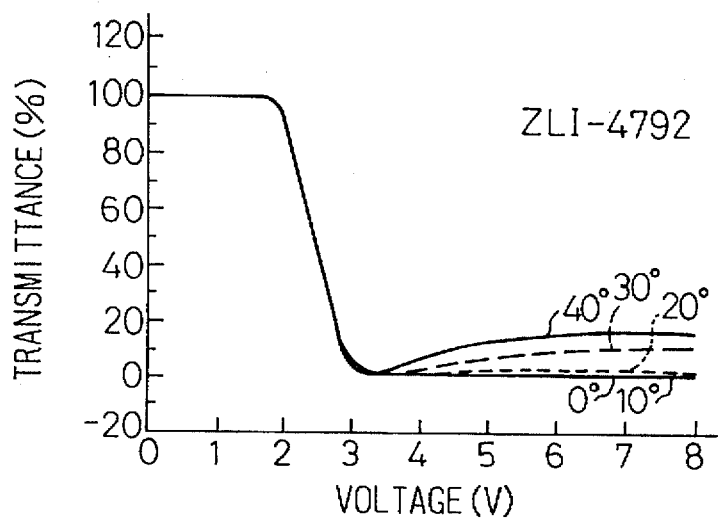

LIQUID CRYSTAL DISPLAY PANEL WITH ALIGNMENT DIVISION AND SMALLER TWIST ANGLE

This application is a continuation of application Ser. No. 08/331,759 filed on Oct. 31, 1994, now abandoned.

BACKGROUND OF THE INVENTION

1. Field of the Invention

The present invention relates to a liquid crystal display panel with alignment division for improving the viewing angle characteristics.

2. Description of the Related Art

Recently, twisted nematic (TN) liquid crystal display panels which make use of the twisted nematic effect have been developed. The TN liquid crystal display panel includes a nematic liquid crystal held between a pair of substrates having alignment films, respectively, and a polarizer and an analyzer disposed outside of the substrates. Rubbing, or another technique, for providing alignment to the liquid crystal is applied to the inner surfaces of the substrates.

The TN liquid crystal display panel is typically used as a horizontally aligned liquid crystal display panel. Specifically, in a horizontally aligned TN liquid crystal display panel, the liquid crystal molecules are aligned generally parallel to the surface of the substrate and twist 90 degrees from one substrate to the other substrate, when the voltage is not applied to the liquid crystal. The liquid crystal molecules then tilt towards the perpendicular with respect to the surface of the substrate, when the voltage is applied. The light transmittance varies between these two conditions, and bright and dark points are produced, whereby a picture image is formed.

On the other hand, in a vertically aligned TN liquid crystal display panel, a vertical alignment film is used. The liquid crystal molecules are aligned generally perpendicular to the surfaces of the substrates when the voltage is not applied to the liquid crystal, and the liquid crystal molecules tilt to become parallel to the surfaces of the substrates, and twist in accordance with the rubbing directions, when the voltage is applied. In this case too, the light transmittance varies between these two conditions, and bright and dark points are produced, whereby a picture image is formed.

It is well known that the viewing angle characteristics, that is, the quality of the image, depends upon the position of the viewer, and changes in TN liquid crystal display panels. For example, an image with a good contrast can be seen if the screen is set up vertically and viewed directly from the front (i.e., from the normal direction). However, the screen may seem too bright when the screen is viewed from above with respect to normal direction, and the screen may seem dark when the panel is viewed from below with respect to the normal direction. It is known that this kind of viewing angle characteristic occurs depending on the rubbing direction of the alignment film, that is, the alignment direction of the liquid crystal molecules.

An alignment division technique has been proposed for improving the viewing angle characteristics (for example, Japanese Unexamined Patent Publication (Kokai) No. 54-5754 and No. 63-106624). Alignment division means that the alignment films are treated such that each small area corresponding to a pixel is divided into two regions (domains) so that one of the regions has one viewing angle characteristic and the other region has another viewing angle characteristic which is opposite to that of the first region. That is, the first region in a given single pixel is treated so that the panel seems too bright when the vertical panel is viewed from the above, and the second region of the same pixel is treated so that the panel seems dark when viewed from below, whereby this pixel provides an average brightness between the characteristics of these regions and the image is neither too bright nor dark from any viewing angle. Alignment division can be carried out, in the simplest example, by once rubbing the alignment film with a first mask applied thereto, and rubbing again the alignment film with a complimentary mask applied thereto.

In the TN liquid crystal display panel, it is said that the arrangement in which a liquid crystal twists 90 degrees will provide the best display quality. However, there is a known TN liquid crystal display panel having the twist angle which is less than 90 degrees. For example, the Japanese Unexamined Patent Publication No. 63-115137 discloses a TN liquid crystal display panel in which the twist angle of the liquid crystal is in the range from 10 to 80 degrees, and the product ($\Delta nd$) of the anisotropy of the refractive index ($\Delta n$) and the layer thickness (d) of the liquid crystal is in the range from 0.2 to 0.7 µm. This prior art proposes to reduce the twist angle and the layer thickness of the liquid crystal, in order to make a gently sloping voltage-transmittance characteristic curve to realize a gray scale display.

The viewing angle characteristics of the liquid crystal display panel can be considerably improved by the above-described alignment division technique. However, there is still a problem that the quality of the display decreases when the viewing angle is made larger.

The invention disclosed in the above-described Japanese Unexamined Patent Publication No. 63-115137 has been made on the premise that the voltage-transmittance characteristic curve is smooth and that there are no lobes or peaks in the curve. However, the actual voltage-transmittance characteristic of a TN liquid crystal display panel is not smooth and changes depending on the viewing angle. The above-described Japanese Publication discloses the voltage-transmittance characteristic curve only when viewed from the front, and there is no teaching with regard to the problem of the viewing angle characteristic at an angle other than perpendicular to the display.

In the conventional TN liquid crystal display panels, the alignment arrangement is such that the twist angle of the liquid crystal is 90 degrees and the product ($\Delta nd$) of the anisotropy of the refractive index ($\Delta n$) and the layer thickness (d) of the liquid crystal is approximately 0.5 µm. In the conventional displays, there is a problems that contrast deteriorates, and an undesirable color may appear, if the twist angle is less than 90, because there is no guarantee that a linearly polarized light incident on the liquid crystal is rotated exactly 90 degrees when the light emerges from the liquid crystal.

SUMMARY OF THE INVENTION

The object of the present invention is to provide a liquid crystal display panel having a high contrast ratio and a good viewing angle characteristic.

According the present invention, there is provided a liquid crystal display panel comprising a pair of substrates each having an alignment film; a liquid crystal held between said pair of substrates, the liquid crystal having a layer thickness (d) and anisotropy of refractive index ($\Delta n$); a polarizer and an analyzer arranged outside said substrates; the alignment films of said pair of substrates being treated in such a manner that liquid crystal molecules twist from one substrate to the other substrate through a predetermined twist angle and the alignment films are divided into minute regions (A and B) so that the liquid crystal molecules in one of the regions align in one direction and the liquid crystal molecules in the other region align in the another direction; the twist angle of the liquid crystal being greater than zero degrees but smaller than 90 degrees; and the product ($\Delta nd$) of the anisotropy of refracted index ($\Delta n$) and the layer thickness (d) of the liquid crystal is smaller than approximately 0.5 μm to ensure that a linearly polarized light incident to the liquid crystal rotates approximately 90 degrees before the light emerges the liquid crystal.

According to this invention, it is possible to obtain a liquid crystal display panel having a viewing angle characteristic superior to a liquid crystal display panel in which an alignment division only is effected and the product ($\Delta nd$) of the anisotropy of the refractive index ($\Delta n$) and the layer thickness (d) of the liquid crystal is not arbitrarily selected in the defined range that is smaller than approximately 0.5 μm.

The inventors have discovered that there is an optimum $\Delta nd$ for a selected twist angle, and that if the selected twist angle is combined with the optimum value of $\Delta nd$, linearly polarized light incident onto the liquid crystal rotates 90 degrees until the light leaves the liquid crystal even though the twist angle of the liquid crystal is less than 90 degrees. Therefore, it is possible to arrange the polarizer and the analyzer perpendicular or parallel to each other, whereby a linearly polarized light incident to the liquid crystal from the polarizer is reliably blocked or transmitted by means of the analyzer, and thus a high contrast is realized.

BRIEF DESCRIPTION OF THE DRAWINGS

The present invention will become more apparent from the following description of the preferred embodiments, with reference to the accompanying drawings, in which:

FIG. 14 is a view illustrating the viewing angle characteristics of the liquid crystal display panel when viewed at several angles from above and from below, in which the twist angle is 90 degrees and the alignment division is carried out;

FIG. 15 is a view illustrating the viewing angle characteristics of the liquid crystal display panel when viewed at several angles from left and from right, in which the twist angle is 90 degrees and the alignment division is carried out;

DESCRIPTION OF THE PREFERRED EMBODIMENTS

The invention will now be described in greater detail with reference to the drawings.

Figure 1:
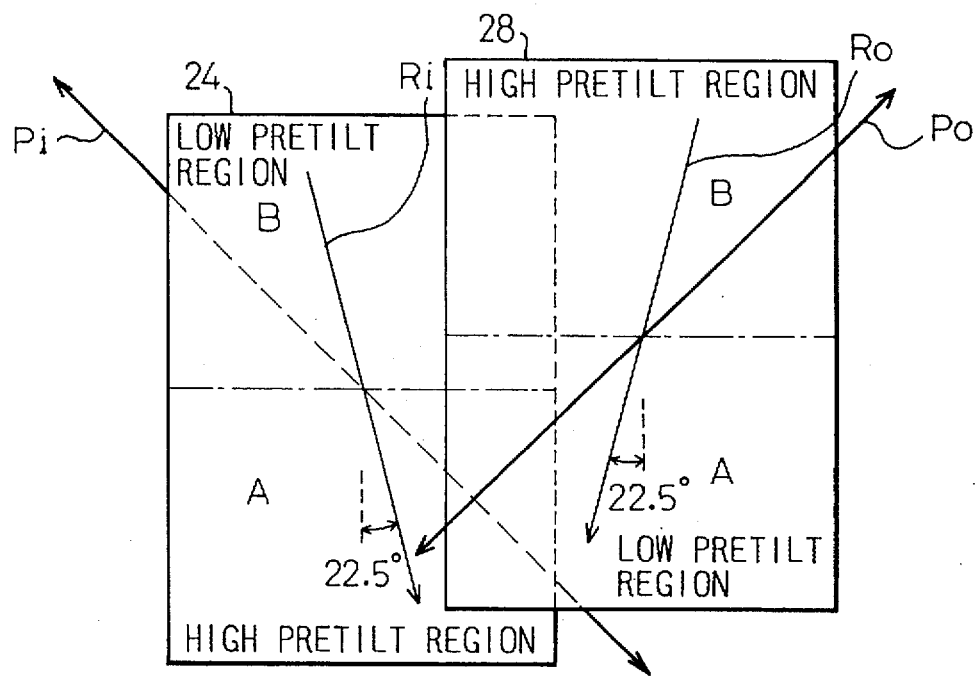
FIG. 1 is a diagrammatic view illustrating the relationship between the rubbing directions and the transmission axes of the polarized light of the liquid crystal display panel according to the first embodiment of the present invention.
Figure 2:
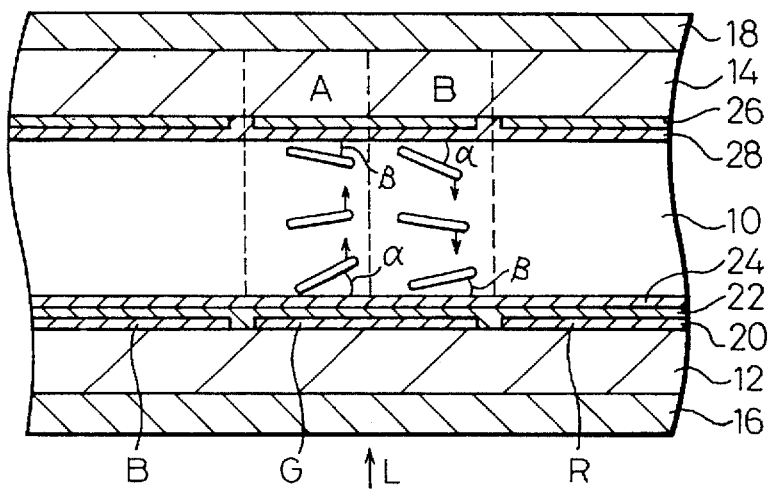
FIG. 2 is a cross-sectional view of the liquid crystal display panel having the alignment arrangement of FIG. 1.

FIGS. 1 and 2 show the liquid crystal display panel according to the first embodiment of the present invention. This liquid crystal display panel comprises a liquid crystal 10 sealingly held between a pair of transparent substrates 12 and 14, and a polarizer 16 and an analyzer 18 disposed on the outside of the pair of substrates 12 and 14, respectively. A light is incident to the liquid crystal display panel in the direction of the arrow L. A color filter 20, a transparent electrode 22, and an alignment film 24 are arranged in this order on the inside surface of one of the substrates 12, and a transparent electrode 26 and alignment film 28 are arranged in this order on the inside surface of the other substrate 14. The color filter 20 has blue (B), green (G), and red (R) regions. The transparent electrode 22 is the common electrode, while the other transparent electrode 26 is a pixel electrode comprising members having a surface area corresponding to that of each of the blue (B), green (G), and red (R) regions of the color filter 20. The pixel electrode 26 is driven by means of an active matrix.

FIG. 1 shows the transmittance axes of the polarizer 16 and the analyzer 18 and the alignment arrangement of the alignment films 24 and 28. The transmittance axis Pi of the polarizer 16 and the transmittance axis Po of the analyzer 18 are perpendicular to each other, and are arranged at an angle of 45 degrees with respect to the horizontal.

The rubbing direction Ri of the alignment film 24 is at an angle of 22.5 degrees with respect to the vertical, and the rubbing direction Ro of the alignment film 28 is also at an angle of 22.5 degrees with respect to the vertical, whereby the rubbing direction Ri and the rubbing direction Ro forms between them an angle of 45 degrees. That is, the liquid crystal 10 is caused to align at a twist angle of 45 degrees. A chiral additive is inserted in the liquid crystal 10 to aid the liquid crystal 10 to so twist.

FIGS. 1 and 2 show the liquid crystal display panel in which an alignment division has been done. FIG. 1 shows a minute region corresponding to one pixel of the alignment films 24 and 28, this minute region being divided into two domains A and B, so that one domain A has one viewing angle characteristics and the other domain B has another viewing angle characteristics which is opposite to the former.

In the domain A, in FIGS. 1 and 2, the alignment film 24 is rubbed so that the liquid crystal molecules contacting the film 24 have a pretilt angle of $\alpha$ with respect to the substrate surface, and the opposite alignment film 28 is rubbed so that the liquid crystal molecules contacting the film 28 have a pretilt angle of B with respect to the substrate surface. There is the relationship of $\alpha>\beta$. In this domain A, the liquid crystal molecules are aligned generally parallel to the substrate surface with the predetermined pretilts $\alpha$ and $\beta$ when the voltage is not applied to the liquid crystal, and the liquid crystal molecules tilt up in the vertical direction with respect to the substrate surface when the voltage is applied to the liquid crystal. In the latter situation, the liquid crystal molecules located intermediately between the substrates 12 and 14 tilt up in the direction in accordance with the liquid crystal molecules having the large pretilt $\alpha$, as shown by the arrows pointing toward substrate 14

In the adjacent domain B, the alignment film 24 is rubbed so that liquid crystal molecules contacting the film 24 have a pretilt angle of $\beta$ with respect to the substrate surface, and the opposite alignment film 28 is rubbed so that liquid crystal molecules contacting the film 28 have a pretilt angle of $\alpha$ with respect to the substrate surface. In this case as well, there is the relationship of $\alpha>\beta$. Therefore, in the domain B as well, the liquid crystal molecules are aligned generally parallel to the substrate surface with the predetermined pretilts $\alpha$ and $\beta$ when the voltage is not applied to the liquid crystal, and the liquid crystal molecules tilt up in the vertical direction with respect to the substrate surface when the voltage is applied, the liquid crystal molecules located intermediately between the substrates 12 and 14 tilt up in the direction in accordance with the liquid crystal molecules having the large pretilt $\alpha$ as shown by the arrows pointing towards substance 12.

That is, if we observe the liquid crystal molecules located intermediately between the substrates 12 and 14, the liquid crystal molecules in the domain A tilt up in the opposite direction from that of the liquid crystal molecules in the domain B. It is known that the manner of the tilting up of the liquid crystal molecules located intermediately between the substrates 12 and 14 influences the viewing angle characteristics. Therefore, the viewing angle characteristics of the domain A differs from the viewing angle characteristics of domain B by the viewing angle of 180 degrees. For example, with regard to the domain A, supposing that the panel seems too bright when the screen is viewed from above and the screen seems dark when the panel is viewed from below the result with regard to the domain B is reversed, that is, the panel seems dark when the panel is viewed from above and the panel seems too bright when the screen is viewed from below. In this manner, because the minute unit region corresponding to one pixel is divided into two domains, A and B having viewing angle characteristics which mutually differ by 180 degrees, the resultant viewing angle characteristic of this minute unit region will be the average of the viewing angle characteristics of the two domains, and the viewing angle characteristic is thus improved by the alignment division.

To realize such an alignment division, it is necessary to perform alignment treatment in such a manner that, for each of the alignment films 24 and 28, the pretilts α and β present alternately in the domains A and B. One example of such an alignment treatment is that the alignment film 24 is rubbed in the direction of the arrow Ri in FIG. 1 and the alignment film 28 is rubbed in the direction of the arrow Ro in FIG. 1. The alignment films are then exposed to an ultraviolet light, using a mask having openings corresponding to the domain A or B so as to change the pretilt characteristics of the domain A and domain B. The exposure to the ultraviolet light is carried out by using, for example, a low voltage mercury lamp. It is possible to change the pretilt characteristics by means of exposure to the ultraviolet light, and it is possible to establish desired pretilt angles in the domains A and B by varying the time of exposure to the ultraviolet light.

Figure 3:
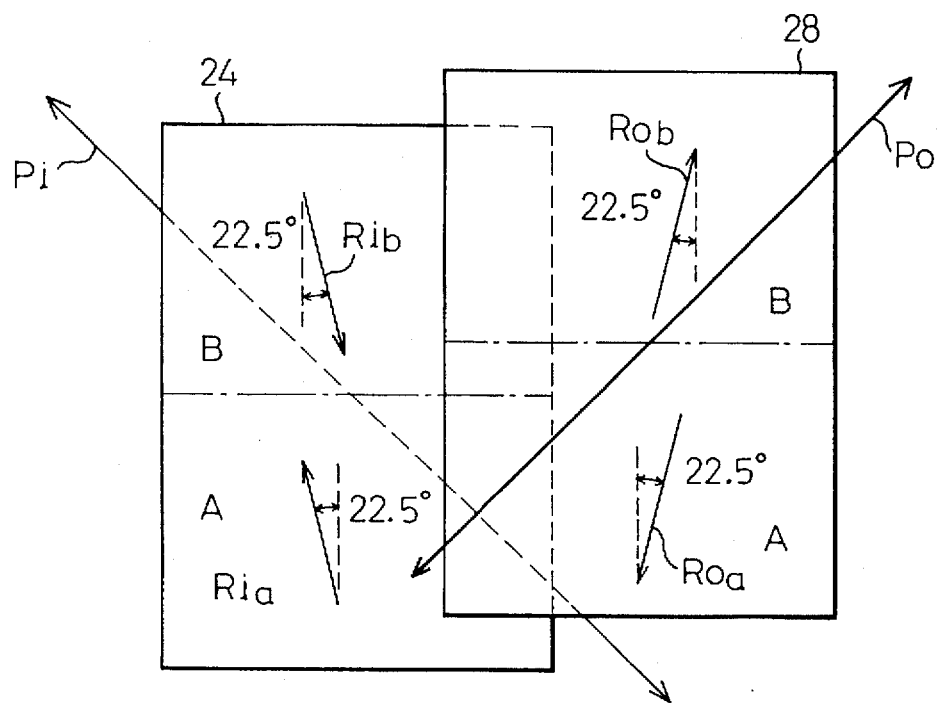
FIG. 3 is a diagrammatic view illustrating another example of the alignment arrangement.
Figure 4:
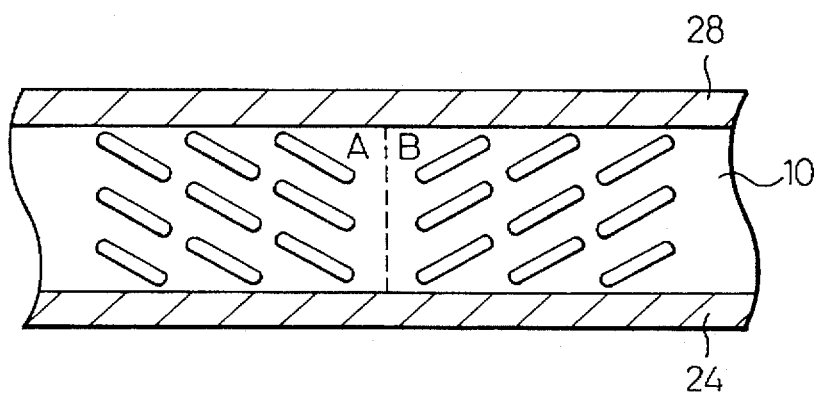
FIG. 4 is a cross-sectional view illustrating the alignment condition of the liquid crystal subjected to the alignment treatment of FIG. 3.

FIGS. 3 and 4 show another example of the alignment treatment. This example is the basic form of the alignment division in which the minute unit region corresponding to one pixel of the display panel is divided into the domains A and B having different mutually opposite viewing angle characteristics, in a similar manner to that of the previously described embodiment. In the above described embodiment, the alignment films 24 and 28 are rubbed in the respectively constant directions, and the pretilt angles α and β are changed in the minute regions corresponding to the domain A and domain B, and the alignment films 24 and 26 are assembled so that the minute regions having the pretilt angles α and β face the minute regions having the different pretilt angles β and α.

In this embodiment, each of the alignment films 24 and 26 is rubbed in opposite directions for each minute region corresponding to the domain A or B. That is, one rubbing is done in the direction of the arrow Ria in the domain A of the alignment film 24, and another rubbing is done in the direction of the arrow Rib in the domain B of the alignment film 24. In the same manner, one rubbing is done in the direction of the arrow Roa in the domain A of the alignment film 28, and another rubbing is done in the direction of the arrow Rob in the domain B of the alignment film 28. This alignment division can be achieved by, for example, using a mask made by a photolithographic technique on the substrate for the first rubbing, and then using a further mask having openings in complimentary positions to those of the first mask for the second rubbing.

Therefore, as shown in FIG. 4, the liquid crystal molecules in each of the domains A and B are aligned with a constant inclination, the inclination of the molecules in the domain A being reverse to the inclination of the molecules in the domain B. Accordingly, the viewing angle characteristics when viewing the display are reversed. For example, with regard to domain A, the display is too bright when viewing from above the normal direction and the display is dark when viewing from below the normal direction and, for the domain B, the display is dark when viewing from above the normal direction and the display is too bright when viewing from below the nomal direction. In this manner, because the minute region corresponding to one pixel of the panel is divided into two domains A and B having opposite viewing angle characteristic, the minute region has viewing angle characteristic that are the average of these two viewing angle characteristics, and the overall viewing angle characteristic is thus improved.

In addition, the transmission axis Pi of the polarizer 16 and the transmission axis Po of the analyzer 18 are perpendicular to each other, and the rubbing directions Ria and Roa, and the rubbing directions Rib and the rubbing direction Rob form the angle of 45 degrees. Therefore, the twist angle of the liquid crystal is also 45 degrees.

Figure 5:
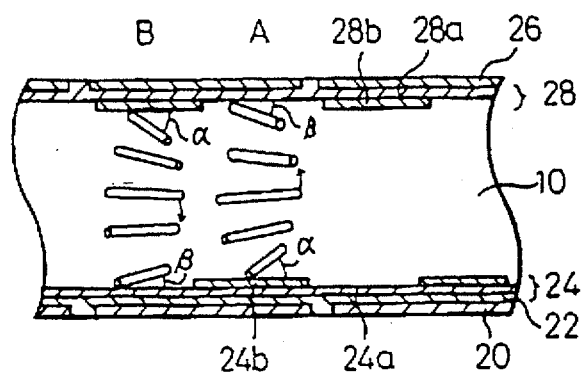
FIG. 5 is a cross-sectional view illustrating further example of the alignment arrangement.

FIG. 5 shows a further example of the alignment arrangement. The pretilt feature is the same as that in the embodiment of FIG. 2. That is, in the domain A, the liquid crystal molecules contacting the alignment film 24 form a pretilt angle of α with respect to the substrate surface, and the liquid crystal molecules contacting the alignment film 28 form a pretilt angle of β with respect to the substrate surface. In the adjacent domain B, the liquid crystal molecules contacting the alignment film 24 form a pretilt angle of B with respect to the substrate surface, and liquid crystal molecules contacting the alignment film 28 form a pretilt angle of α with respect to the substrate surface. In this case as well, there is the relationship α>β. Therefore, the liquid crystal molecules of the domain A tilt up in the direction opposite from that of the liquid crystal molecules of the domain B, as shown by the arrows.

The change of the pretilt angle is caused by the selective exposure to ultraviolet light after the rubbing in the embodiment of FIG. 2. In FIG. 5, however, each of the alignment films 24 and 28 comprises two layers of different materials 24a, 24b, 28a, and 28b, respectively. The upper material layers 24b and 28b have openings corresponding to the domain A or B. Each of the alignment films 24 and 28 is rubbed in the constant direction. While the upper material layers 24b and 28b are rubbed in the same direction as the parts of the lower material layers 24a and 28a which are exposed through the openings in the upper material layers 24b and 28b, the lower material layers 24a and 28a and the upper material layers 24b and 28b are selected to present different pretilt angles, so that the alignment division described above is achieved.

The present invention improves the viewing angle characteristics by the combination of the alignment division described herein and the feature that the liquid crystal twist angle is less than 90 degrees. In this case, the product (Δnd) of the anisotropy of the refractive index (Δn) and the layer thickness (d) of the liquid crystal is selected in the defined range that is smaller than approximately 0.5 μm. However, the product Δnd is not arbitrarily selected in the defined range that is smaller than approximately 0.5 μm. The inventors have discovered that there is an optimum Δnd for a selected twist angle, and that if that selected twist angle is combined with the optimum value of Δnd, a linearly polarized light incident to the liquid crystal rotates 90 degrees until the light leaves the liquid crystal even though the twist angle of the liquid crystal is less than 90 degrees.

Figure 6:
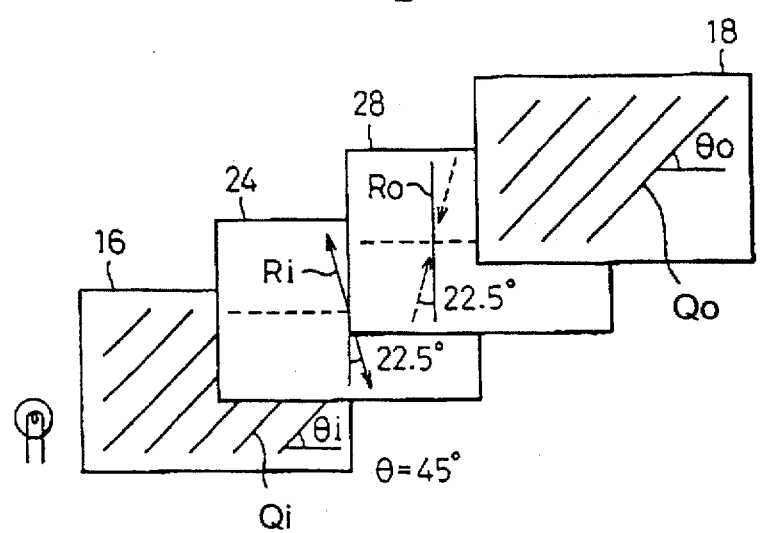
FIG. 6 is a diagrammatic view illustrating an example of an optical system used in an experiment to investigate the possibility that a linearly polarized light rotates 90 degrees.
Figure 7A:
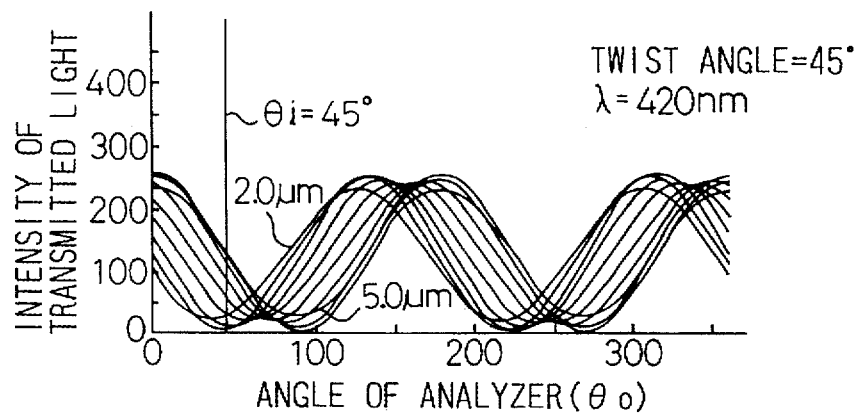
FIGS. 7A to 7C are views plotting the intensity of the transmitted light when the twist angle is 45 degrees.
Figure 7B:
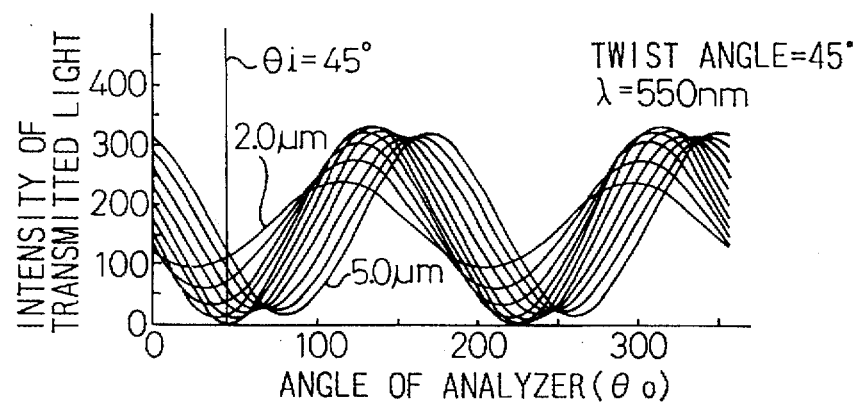
Figure 7C:
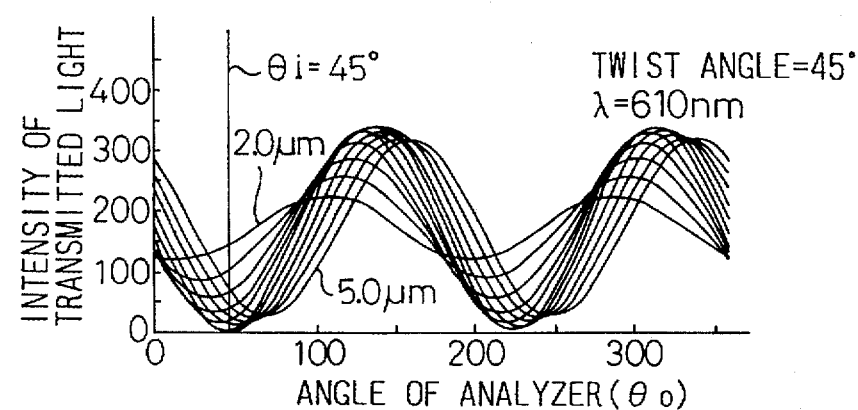

FIG. 6 shows an example of an optical system used in an experiment, and FIGS. 7A to 7C show the experimental results which indicate that there is an optimum Δnd at which a linearly polarized light incident to the liquid crystal rotates 90 degrees before it leaves the liquid crystal, when the twist angle is 45 degrees.

In FIG. 6, the rubbing direction Ri of the alignment film 24 and the rubbing direction Ro of the alignment film 28 are the same as those in FIG. 1, and the positioning of the polarizer 16 and the analyzer 18 is also the same as that shown in FIG. 1. However, the absorption axis $Q_i$ of the polarizer 16 and the absorption axis $Q_o$ of the analyzer 18 are shown in FIG. 6, and these correspond to the transmission axes Pi and Po of the analyzer and the polarizer of FIG. 1 after being rotated 90 degrees.

In the optical system in FIG. 6, the angle θi of the absorption axis $Q_i$ of polarizer 16 with respect to the horizontal is fixed at 45 degrees, while the angle θo of the absorption axis $Q_o$ of the analyzer 18 with respect to horizontal is changed by rotating the analyzer 18 counter-clockwise from the angle of 0 degree. The results of measuring the intensity of the linearly polarized light emitted from analyzer 18 after impinging on the polarizer 16, and passing through the liquid crystal 10, during the rotation of the analyzer are shown in FIGS. 7A to 7C.

FIG. 7A is the result for blue light component (wavelength: 420 n), FIG. 7B is for green light component (wavelength: 550 nm), and FIG. 7C is for red light component (wavelength: 610 nm). Measurements were made by preparing the liquid crystal display panels having different layer thicknesses d (gap between the substrates) from 2.0 μm to 5.0 μm in 0.3 μm steps, and by measuring the intensity of the transmitted light for every liquid crystal display panel. The liquid crystal 10 used was ZLI-4792 (manufactured by Merck) with Δn=0.094.

It can be seen, from FIG. 7, that there is an optimum liquid crystal layer thickness d for a twist angle of 45 degrees by which the polarization axis of the incident linearly polarized light rotates 90 degrees before the light is emerges. That is, when the angle $θ_o$ of the analyzer 18 becomes the same as the angle θi=45 of the polarizer 16, the transmission axis (or absorption 5 axis) of the polarizer 16 and the transmission axis (or absorption axis) of the analyzer 18 become parallel to each other, and when the intensity of the transmitted light under these conditions is zero, it can be considered that no incident linearly polarized light passes through the analyzer 18 and that the polarization axis of the linearly polarized light incident to the liquid crystal 10 rotates 90 degrees before the light emerges.

In FIG. 7A, it is the curve for the layer with a thickness d of approximately 2.5 μm in the liquid crystal 10 that indicates that the intensity of the transmitted light becomes zero when the installation angle $θ_o$ of the analyzer 18 is 45 degrees. Since the Δn of the liquid crystal 10 is 0.094, the optimum Δnd for the light is 0.235 μm.

In FIG. 7B, it is the curve for the layer with a thickness d of approximately 3.2 μm in the liquid crystal 10 that indicates that the intensity of the transmitted light becomes zero at 45 degrees. Therefore, the optimum Δnd for the green light is 0.301 μm. In FIG. 7C, it is the curve having the layer thickness d of approximately 3.5 μm in the liquid crystal 10 that indicates that the intensity of the transmitted light becomes zero at 45 degrees. Therefore, the optimum Δnd for the red light is 0.329 μm.

Figure 8A:
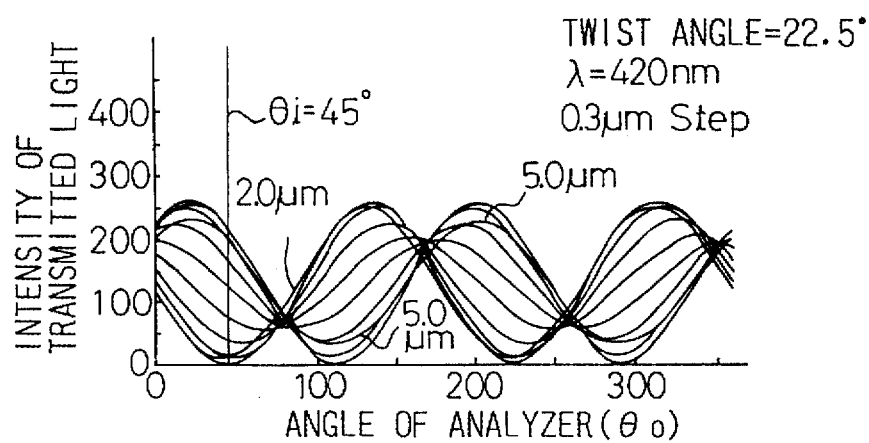
FIGS. 8A to 8C are views plotting the intensity of the transmitted light when the twist angle is 22.5 degrees.
Figure 8B:
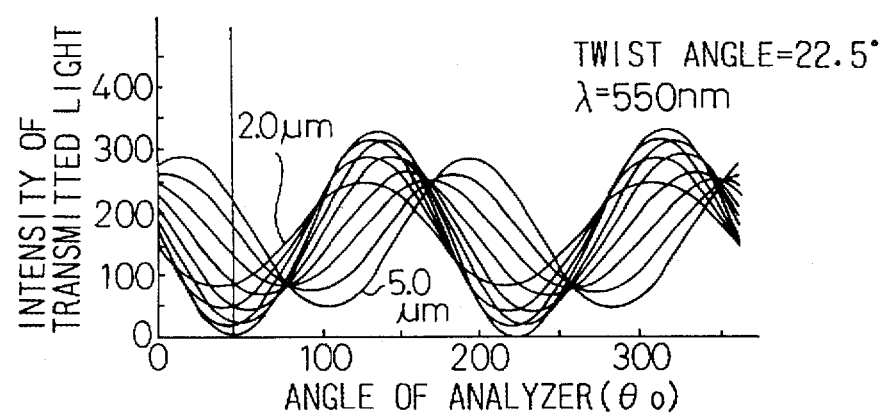
Figure 8C:
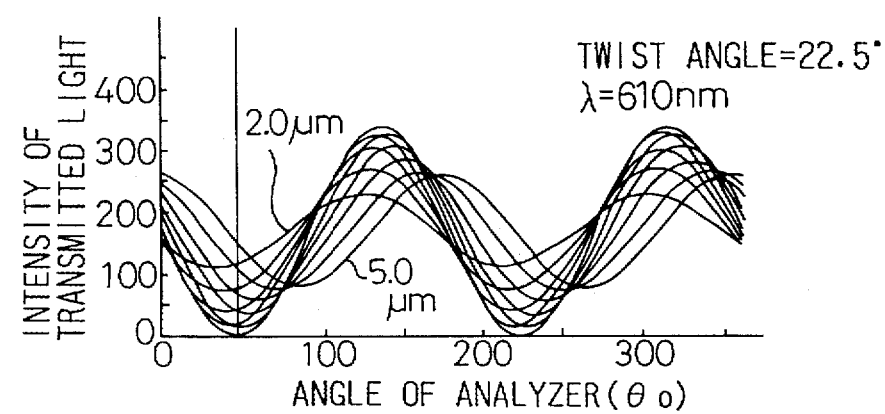
Figure 9A:
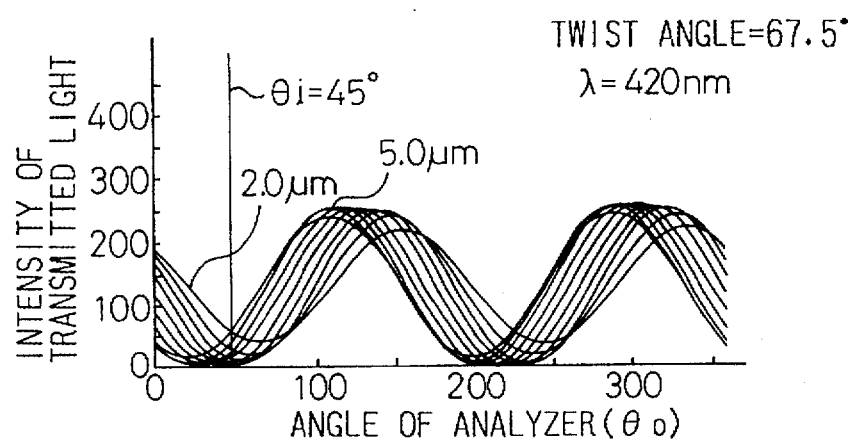
FIGS. 9A to 9C are views plotting the intensity of the transmitted light when the twist angle is 67.5 degrees.
Figure 9B:
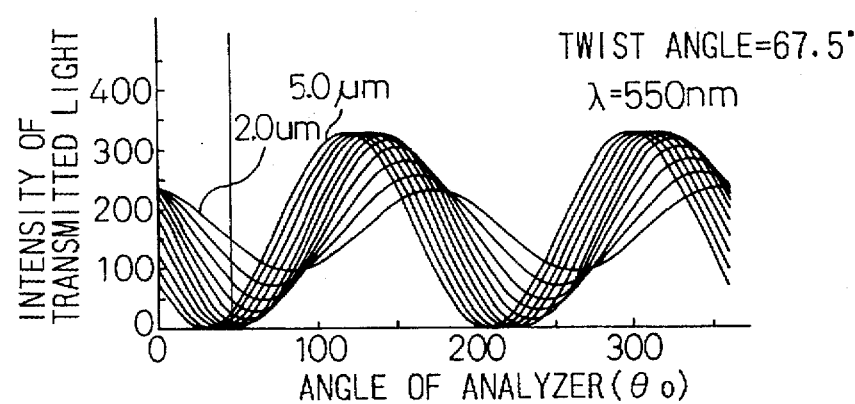
Figure 9C:
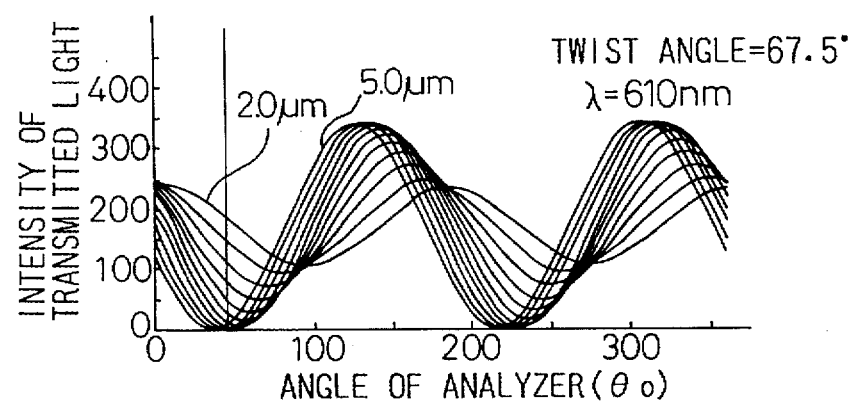

FIGS. 8A to 8C show the intensity of the transmitted light with respect to the rotation angle $θ_o$ of the analyzer 18 for the same liquid crystal, regarding the twist angle of 22.5 degrees. FIGS. 9A to 9C show the intensity of the transmitted light with respect to the rotation angle $θ_o$ of the analyzer, regrading the twist angle of 67.5 degrees. In these Figures, it can be seen that there is an optimum value for the layer thickness d of the liquid crystal at which the polarization axis of the linearly polarized incident light rotates 90 degrees. The following Table 1 shows the optimum layer thicknesses d of the liquid crystal for a variety of twist angles. When the twist angle is 0, that is, in the case of homogeneous alignment, it is in the well known λ/2 condition. The present invention can be practiced in a desirable manner even for the ultimate value of the twist angle near 0 degree (homogeneous alignment).

TABLE 1

| | (Δn = 0.094) | | |
|---|---|---|---|
| Twist angle | Blue (420 nm) | Green (550 nm) | Red (610 nm) |
| 0° | Approx. 2.2 μm | Approx. 2.7 μm | Approx. 3.0 μm |
| 10.0° | Approx. 2.2 μm | Approx. 2.8 μm | Approx. 3.2 μm |
| 20.0° | Approx. 2.2 μm | Approx. 2.9 μm | Approx. 3.2 μm |
| 22.5° | Approx. 2.2 μm | Approx. 2.9 μm | Approx. 3.2 μm |
| 30.0° | Approx. 2.3 μm | Approx. 3.0 μm | Approx. 3.3 μm |
| 40.0° | Approx. 2.4 μm | Approx. 3.1 μm | Approx. 3.5 μm |
| 45.0° | Approx. 2.5 μm | Approx. 3.2 μm | Approx. 3.5 μm |
| 50.0° | Approx. 2.5 μm | Approx. 3.3 μm | Approx. 3.7 μm |
| 60.0° | Approx. 2.6 μm | Approx. 3.5 μm | Approx. 4.0 μm |
| 67.5° | Approx. 2.9 μm | Approx. 3.8 μm | Approx. 4.2 μm |
| 70.0° | Approx. 3.0 μm | Approx. 3.9 μm | Approx. 4.4 μm |
| 80.0° | Approx. 3.1 μm | Approx. 4.3 μm | Approx. 4.8 μm |

In this manner, it is possible to provide a high contrast display because, in the normally-white mode in the which polarizer 16 and the analyzer 18 are disposed perpendicular to each other, since the polarization axis of the incident linearly polarized light rotates 90 degrees during it propagates through the liquid crystal, all the incident linearly polarized light which rotates 90 degrees passes through the analyzer 18 when a voltage is not applied to the liquid crystal, and the linearly polarized light passes through the vertically aligned liquid crystal is totally blocked by the analyzer 18 when a voltage is applied to the liquid crystal. In the normally black mode in which the polarizer 16 and the analyzer 18 are disposed parallel to each other, all the incident linearly polarized light which rotates 90 degrees is blocked by the analyzer 18 when voltage is not applied, and the linearly polarized light passes through the vertically aligned liquid crystal when the voltage is applied.

It is desirable to adopt a multi-gap construction in which the gap between the substrates (the layer thickness of the liquid crystal) changes for each color. In this case, it is possible to realize a multi-gap construction by, for example, varying the thickness of the color filter 20. In practice, however, it is sufficient to adopt the constant gap thickness in conformity with the layer thickness for the intermediate, green color, even without using a multi-gap construction. If this is adopted, a possible problem occurs only in the color for the white display in the normally white mode, and there is little influence on the contrast ratio. If the gap thickness is constant, it is also possible to perform slight drive voltage adjustments for blue, green, and red pixels.

Figure 10:
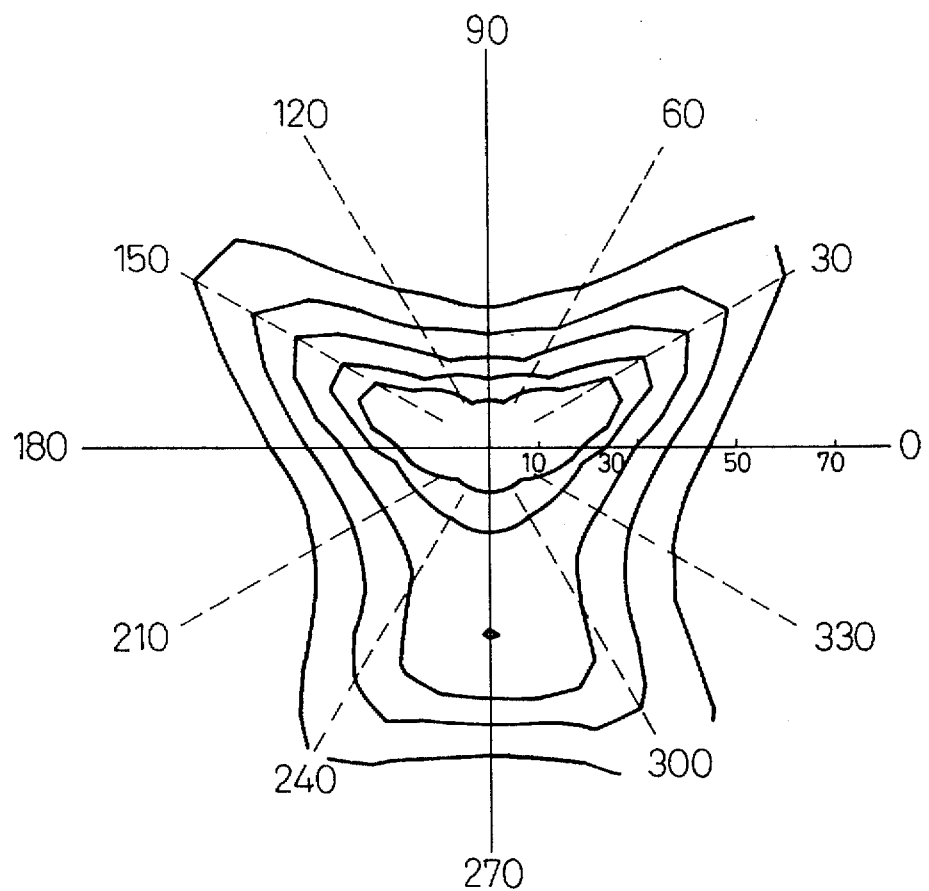
FIG. 10 is a view illustrating isocontrast curves of the conventional TN liquid crystal display panel.

FIG. 10 shows an example of isoconstrast lines of the conventional liquid crystal display panel in which the twist angle is 90 degrees and no alignment division is done. The horizontal axis represents the viewing angle when the panel is viewed in the various directions from the left or the right with respect to the normal direction to the panel, and the vertical axis represents the viewing angle when the panel is viewed in the various directions from the above or below the normal direction to the panel.. In this case, the contrast decreases extremely when the screen is viewed from above the normal direction.

Figure 11:
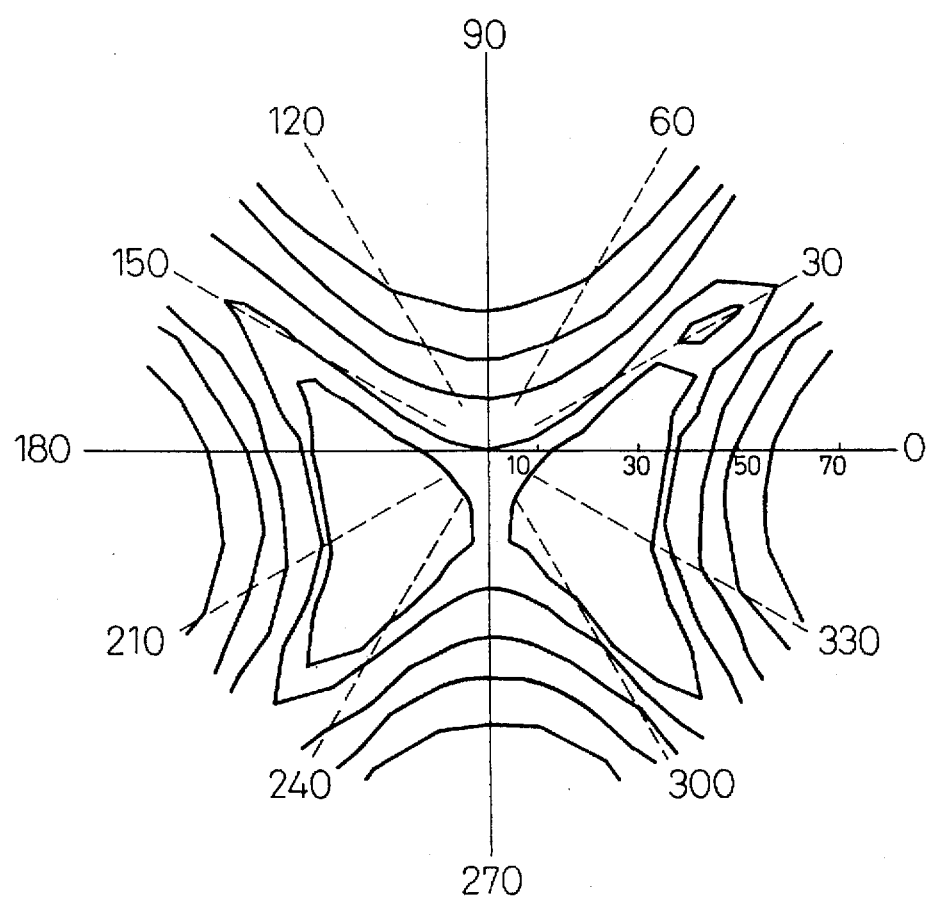
FIG. 11 is a view illustrating the isocontrast curves of the conventional TN liquid crystal display panel when the twist angle is 45 degrees but the alignment division is not carried out.

FIG. 11 shows an example of isocontrast lines of the conventional liquid crystal display panel in which the twist angle is 45 degrees and no alignment division is done. In FIG. 11, the viewing angle characteristic above the normal direction is not so good, similar to the example in FIG. 10.

Figure 12:
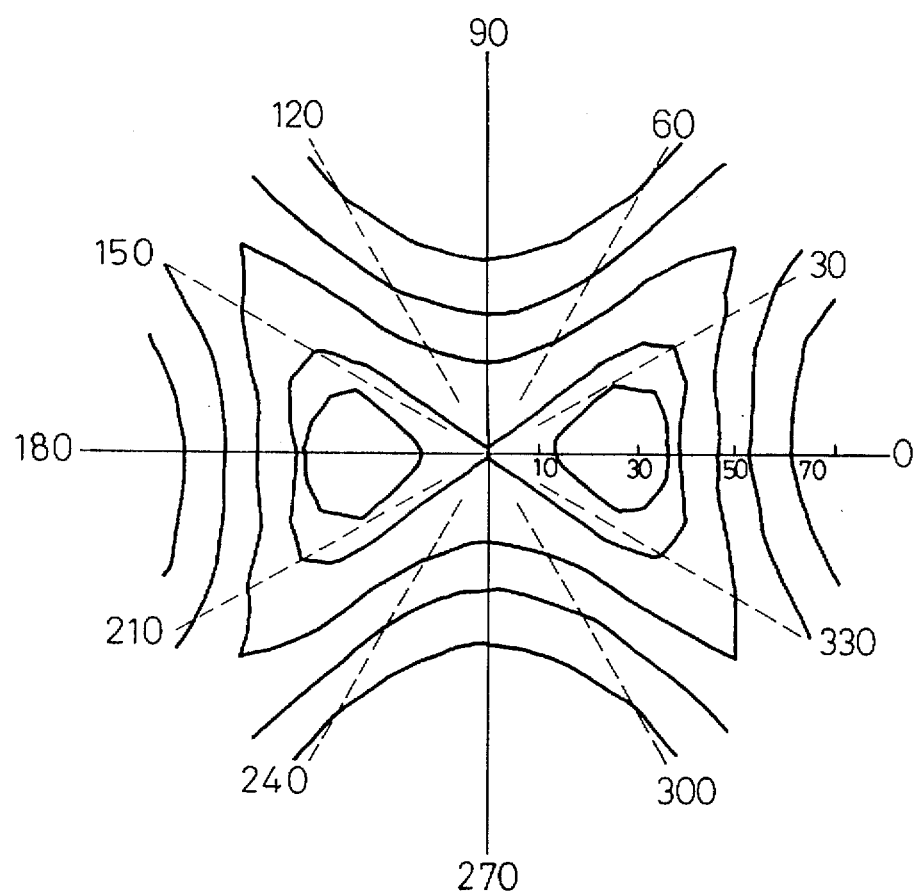
FIG. 12 is a view illustrating the isocontrast curves of the TN liquid crystal display panel according to the present invention, when the twist angle is 45 degrees and the alignment division is carried out.

FIG. 12 shows an example of isocontrast lines of the conventional liquid crystal display panel in which the twist angle is 45 degrees and the alignment division is done. As can be seen from FIG. 12, according to the present invention, the viewing angle characteristic, above and below the normal is improved.

In this manner, it is possible to improve the viewing angle characteristics greatly, by carrying out the alignment division and by selecting a twist angle of less than 90 degrees, preferably in the range between approximately 0 and 60 degrees. In addition, if the twist angle is set in the range from approximately 10 to 50 degrees, it is possible to provide a good display with high contrast and a superior viewing angle characteristic. In particular, if the twist angle is approximately 45 degrees and $\Delta$nd=0.3 µm, it is possible to provide a display with a good viewing angle characteristic and a good appearance. The value of $\Delta$nd=0.3 µm is approximately a half of 0.5 µm which was believed to be the minimum value of $\Delta$nd in the conventional TN liquid crystal layer with a twist angle of 90 degrees.

Figure 13:
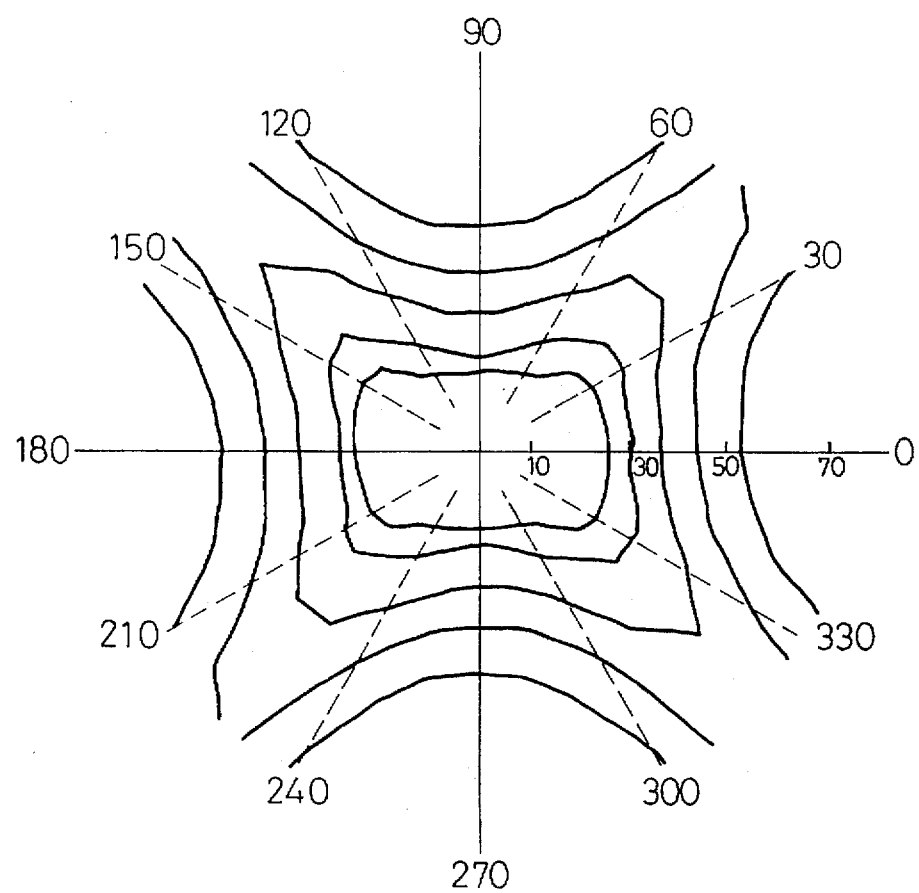
FIG. 13 is a view illustrating the isocontrast curves of the TN liquid crystal display panel according to the present invention, when the twist angle is 45 degrees, the alignment division is carried out, and a phase film is inserted.

FIG. 13 shows an example of isocontrast lines of the conventional liquid crystal display panel in which the twist angle is 45 degrees and the alignment division is done, and in addition, a phase film, described later, is inserted. In the liquid crystal display panel of FIG. 12, the viewing angle characteristics are improved so that the isocontrast lines are symmetrically distributed in the vertical and horizontal directions, but the area of the high isocontrast lines located in the center of FIG. 12 is narrow in the vertical direction. In contrast to this, in the liquid crystal display panel shown in FIG. 13, the area of the high isocontrast lines at the center is widened.

FIGS. 14 and 15 show the viewing angle characteristics of a liquid crystal display panel in which the twist angle is 90 degrees and in which alignment division is done. The horizontal axis represents the voltage and the vertical axis represents the light transmittance. The light transmittance is 100 percent when the voltage is not applied to the liquid crystal. The light transmittance decreases as the voltage increases (in the case of the normally white mode). Accordingly, it is possible to present a white display when the voltage is 0V and to present a black display when the voltage is in the range from 4 to 5V.

The curves in FIG. 14 are plotted for the viewing angles of 0, 10, 20, 30, and 40 degrees in the directions from above and below the normal. It can be seen that the contrast changes greatly when the viewing angle becomes large, because the transmittances in these curves differ from one another at the same voltage.

The curves in FIG. 15 are plotted for the viewing angles of 0, 10, 20, 30, and 40 degrees in the directions left and right from the normal. The transmittance decreases as the voltage increases and the transmittance thereafter increases as the voltage further increases. This is so called the brightness reversal. As can be seen from these Figures, even if the twist angle is 90 degrees but alignment division is performed, it is possible to somewhat improve the viewing angle characteristic but a need still exists to further improve the contrast and reduce the brightness reversal.

Figure 16:
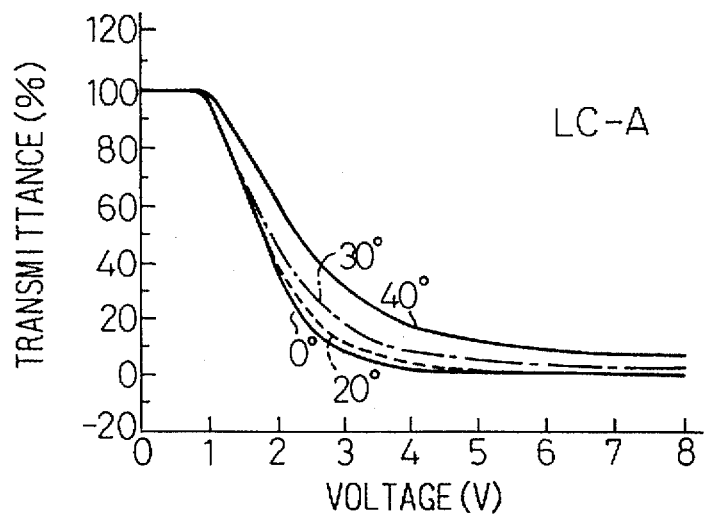
FIG. 16 is a view illustrating the view angle characteristics of the liquid crystal display panel when viewed at several angles from above and from below, in which the twist angle is 45 degrees and the alignment 10 division is carried out.
Figure 17:
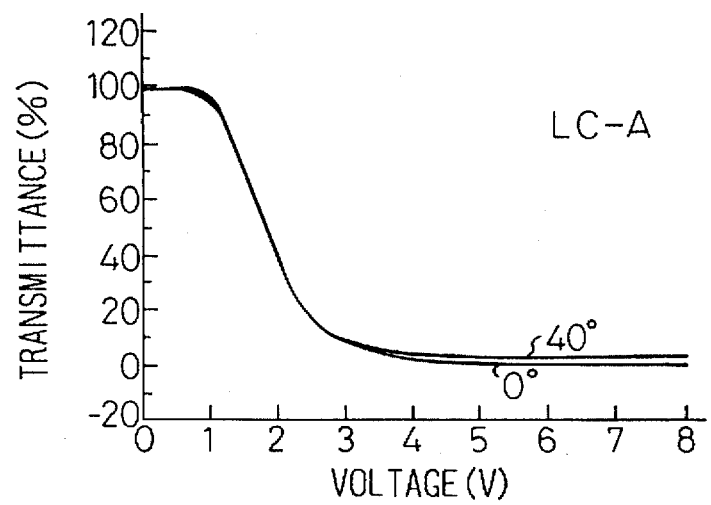
FIG. 17 is a view illustrating the viewing angle characteristics of the liquid crystal display panel when viewed at several angles from left and from right, in which the twist angle is 45 degrees and the alignment division is carried out.

FIGS. 16 and 17 show the viewing angle characteristics of the liquid crystal display panel in which the twist angle is 45 degrees and alignment division is done. The curves of FIG. 16 are plotted for the viewing angles of 0, 10, 20, 30, and 40 degrees in the directions above and below normal, and the curves of FIG. 17 are plotted for the viewing angles of 0, 10, 20, 30, and 40 degrees in the directions left and right from the normal. As can be seen from these Figures, according to the present invention, the difference in the contrast depending on the viewing angle and the brightness reversal are eliminated. In particular, the viewing angle characteristics in the directions from the left and the right to the normal do not differ from each other in the range from 0 to 40 degrees.

The liquid crystal 10 used in this example was a low voltage liquid crystal A (see Table 3) having $\Delta$=0.088 (trifluoride base, distributed by Chisso Chemistry in Japan), and the liquid crystal display panel was made using this liquid crystal and adopting a twist angle of 45 degrees. In this case, the optimum layer thickness d (gap between the substrates) of the liquid crystal 10 is approximately 3.5 µm and $\Delta$nd=0.308 µm. The alignment division was imparted to this liquid crystal display panel.

Figure 18:
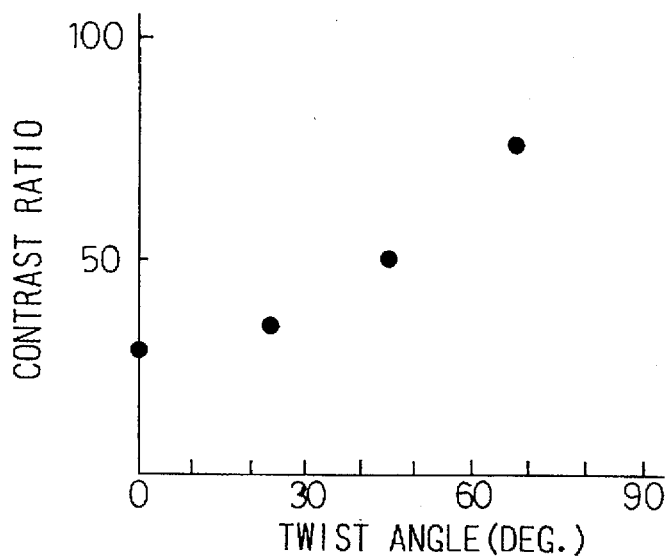
FIG. 18 is a view illustrating the relationship between the twist angle and the contrast ratio.

FIG. 18 shows the results of an experiment concerning the relationship between the twist angle and the contrast ratio of the front (normal) viewing angle. The front contrast ratio is plotted under the same voltage. In these experimental results, there is a tendency that the contrast decreases as the twist angle becomes smaller. However, it is possible to compensate for the drop in the contrast when the twist angle becomes smaller, by increasing the drive voltage to the liquid crystal. So it is desirable to adopt a low-voltage-drive liquid crystal material in the present invention. Also, by making the twist angle smaller, it is possible to raise the viewing angle at which the brightness reversal occurs to a larger value, as shown in the following Table.

TABLE 2

| Twist angle | Angle of Brightness Reversal (Up-Down Direction) |
| --- | --- |
| 0° | ±75° |
| 22.5° | ±77° |
| 45.0° | ±60° |
| 67.5° | ±50° |
| 90.0° | ±40° |

Figure 19:
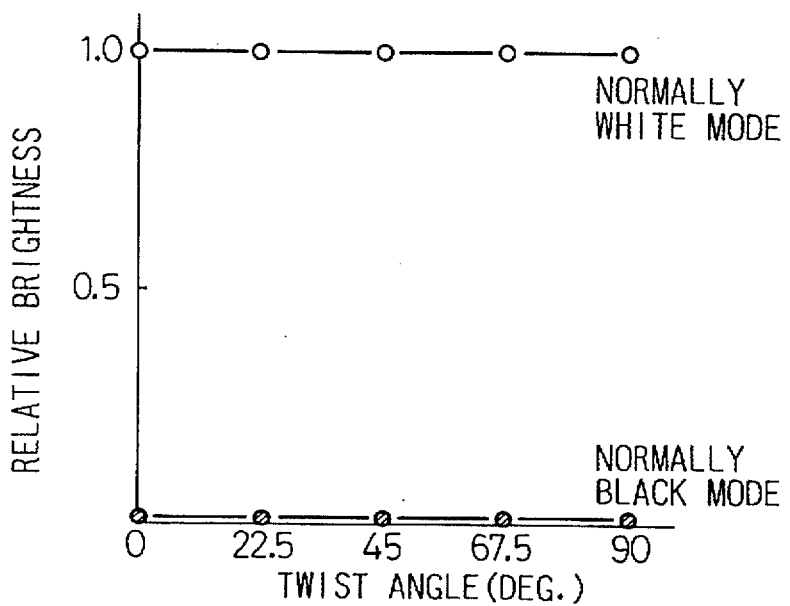
FIG. 19 is a view illustrating the relationship between twist angle and the relative brightness.

FIG. 19 shows the brightness, when the voltage is not applied, of the liquid crystal display panel manufactured under the multi-gap conditions, shown in Table 1. By applying the multi-gap conditions, it can be seen that it is possible to provide a brightness of a level identical to that of the conventional TN liquid crystal display panel.

Figure 20:
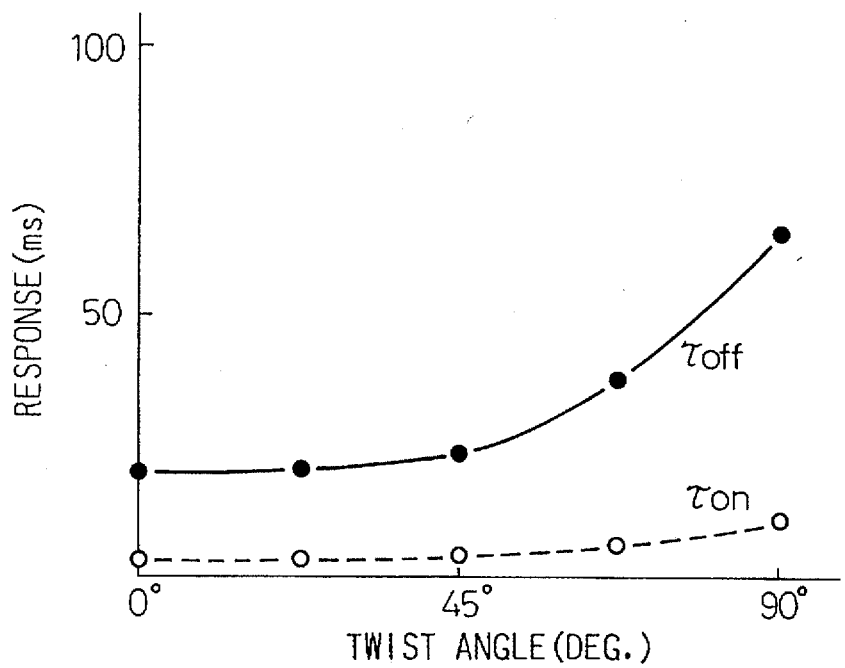
FIG. 20 is a view illustrating the relationship between the twist angle and the response time.

FIG. 20 shows the relationship between the twist angle and the response. In this Figure, $\tau_{off}$ and $\tau_{on}$ are the responses when the drive voltage is switched off and on, respectively. It can be seen that the response is faster when the twist angle is below approximately 45 degrees.

In the above explanation, the optimum value of $\Delta$nd is established by making the layer thickness (gap thickness) of the liquid crystal smaller. For example, the layer thickness is approximately 3 µm when the twist angle is 45 degrees (in the case of ZLI-4792). However, if the layer thickness of the liquid crystal is made so small, there is a possibility that dust or other matter which may intrude into the panel may cause the production yield of liquid crystal display panel to drop. To overcome this problem, it is possible to first select the desired value of the layer thickness d of the liquid crystal, for example, approximately 5 µm (which is often used in conventional liquid crystal display devices) and then to select $\Delta$n of the liquid crystal depending on the selected layer thickness d and the selected $\Delta$nd. However, if the value of $\Delta$n is very small, the response speed will drop, and so it is believed that $\Delta$n is preferably in the range from 0.1 to 0.05. For example, in the case where the trifluoride based liquid crystal B (see Table 3) (Δn=0.069, distributed by Chisso) is used as a liquid crystal material having a small Δn, adapted to be driven by the low voltage, and possessing a small value of Δn, is used, the layer thickness d (gap thickness) of the liquid crystal is approximately 4 μm for the twist angle of 45 degrees. This would not lead to a large drop in the production yield. The liquid crystal materials used are listed in the following Table 3, with drive voltage.

TABLE 3

| LC Material | Δn | 90° Twist | 45° Twist |
| --- | --- | --- | --- |
| LC-A | 0.088 | −3 V | −5 V |
| LC-B | 0.069 | −3 V | −5 V |
| ZLI-4792 | 0.094 | −5 V | −8 V |

Figure 21:
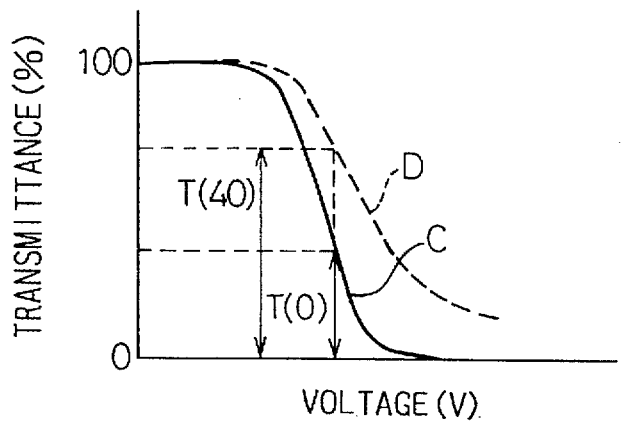
FIG. 21 is a view illustrating the relationship between the voltage and the transmittance for illustrating a viewing angle parameter.
Figure 22:
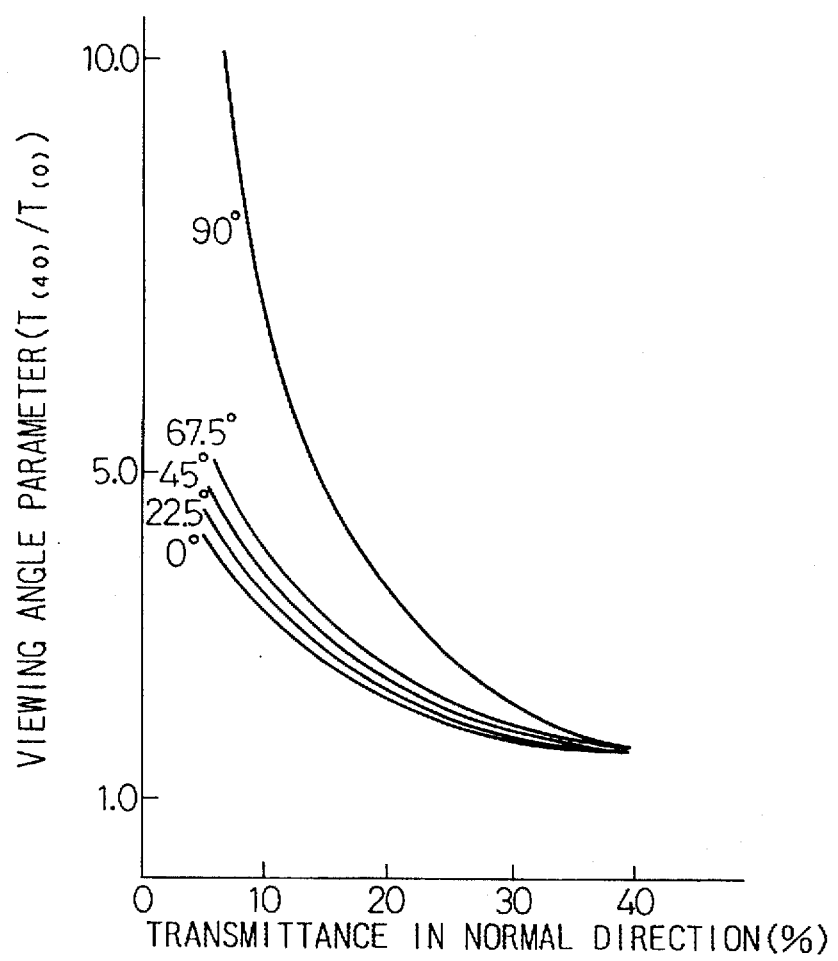
FIG. 22 is a view illustrating the relationship between the transmittance in the normal direction and the viewing angle parameter.

FIG. 22 shows the relationship between the front (normal) transmittance and the viewing angle parameter, and FIG. 21 explains the viewing angle parameter of FIG. 22 by showing the relationship between the voltage and transmittance.

In FIG. 21, the curve C shows the transmittance when viewed the liquid crystal display panel in the normal direction, with the panel having a certain twist angle and the alignment division effected thereto, and the curve D shows the transmittance of the same liquid crystal display panel when viewed in the directions from above and from below the normal at an angle of 40 degrees. T(0) is a value on the curve C for a given voltage, and T(40) is a value on the curve D for the same voltage. The ratio T(40)/T(0) is taken as the viewing angle parameter.

In FIG. 22, the horizontal axis represents the transmittance in the normal direction, and the vertical axis represents the viewing angle parameter. However, the transmittance in the normal direction in FIG. 22 is plotted such that the value 100 percent in FIG. 22 corresponds to that in FIG. 21 when the voltage is zero and that the transmittance in the normal direction increases as the voltage decreases. FIG. 21 is a typical example of a transmittance curve, and does not correspond to a specific twist angle. The transmittance curve of FIG. 21 can be provided for each specific twist angle. FIG. 22 shows the viewing angle parameters for specific twist angles. It can be seen from FIG. 22 that the viewing angle parameters decrease and the difference between the contrast in the normal direction and the contrast in the directions from above and from below at 40 degrees becomes smaller as the twist angle decreases.

Figure 23:
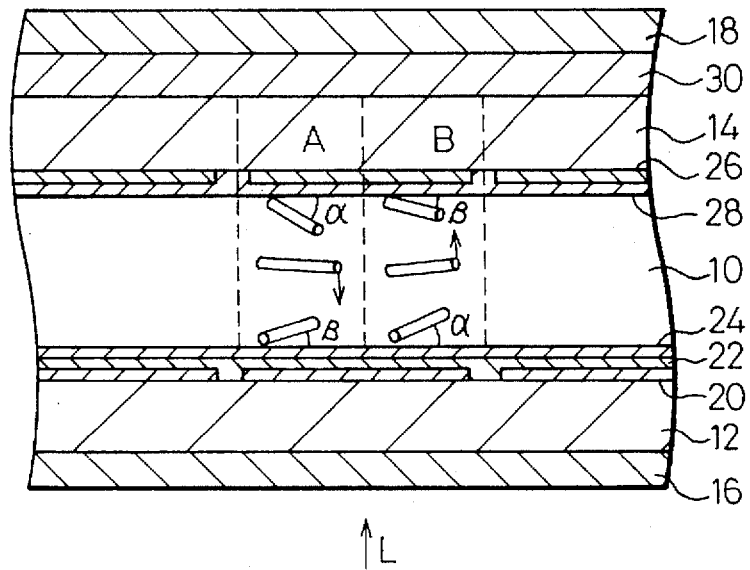
FIG. 23 is a cross-sectional view of the liquid crystal display panel according to the second embodiment of the present invention.
Figure 24:
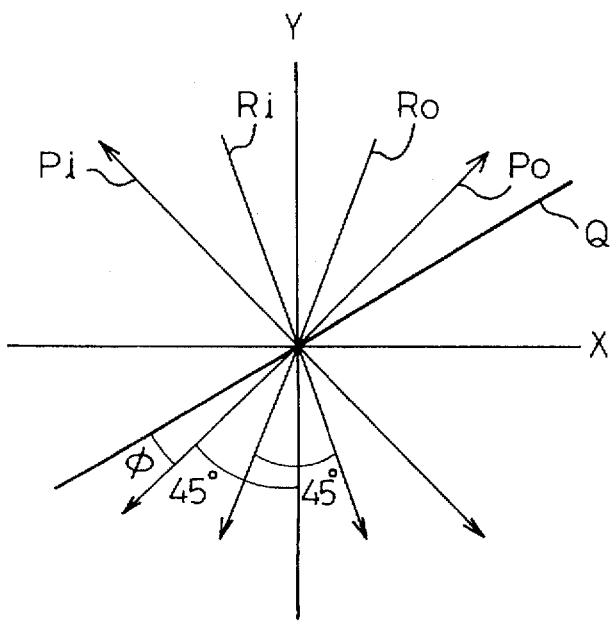
FIG. 24 is a diagrammatic view illustrating the alignment arrangement of FIG. 23.

FIGS. 23 and 24 show the liquid crystal display panel according to the second embodiment of the present invention. This liquid crystal display panel comprises a liquid crystal 10 sealingly held between a pair of transparent substrates 12 and 14, and a polarizer 16 and an analyzer, similar to the embodiment shown in FIGS. 1 and 2. A color filter 20, a transparent electrode 22, and an alignment film 24 are provided on the inside surface of one of the substrates 12, and a transparent electrode 26 and an alignment film 28 are provided on the inside surface of the other substrate 14.

The transmission axis Pi of the polarizer 16 and the transmission axis Po of the analyzer 18 are arranged perpendicular to each other, and at an angle of 45 degrees with respect to the horizontal. The rubbing direction Ri of the alignment film 24 is at an angle of 22.5 degrees with respect to the vertical, and the rubbing angle Ri of the alignment film 28 is at angle of 22.5 degrees with respect to the vertical, the rubbing angles Ri and Ro forming an angle of 45 degrees between them. In addition, the liquid crystal display panel has an alignment division formed thereon in which a minute region corresponding to one pixel is divided into one domain A and another domain B so that the viewing angle characteristic in the domain A is opposite to that in the domain B. The method of carrying out the alignment division is not limited to that of FIGS. 1 and 2.

In FIG. 23 and FIG. 24, a phase film 30 is inserted between the substrate 14 on the outlet side and the analyzer 18. The phase film 30 is a uniaxial film having a slow axis Q which is set so as to be at an angle of φ with respect to the transmittance axis Po of the analyzer 18. Preferably, the setting angle φ of the phase film 30 is in the range from 0 to 45 degrees.

The advantage of the provision of the phase film 30 will be apparent from the foregoing explanation with reference to FIG. 13. That is, the area of the high isocontrast curves in the direction vertical to the normal is narrow in the liquid crystal display panel of FIG. 12, and the area of the high isocontrast curves can be widened in the liquid crystal display panel of FIG. 13. Therefore, it is possible to provide an image which can be viewed with a higher contrast over a wider viewing angle. It will be noted that if the twist angle is smaller, the amount of the tilting-up of the liquid crystal molecules will be insufficient and a retardation will remain in the tilting-up of the liquid crystal in the Y axis direction. However, by inserting the phase film 30 according to this embodiment, a corresponding amount of the retardation is introduced in the x-axis direction, thereby compensating for the retardation in the y-axis direction. The retardation (Δnd) of the phase film 30 should be a value corresponding to the remaining retardation in the Y axis direction, but it is effective if the phase film 30 has a retardation below 100 nm.

Figure 25:
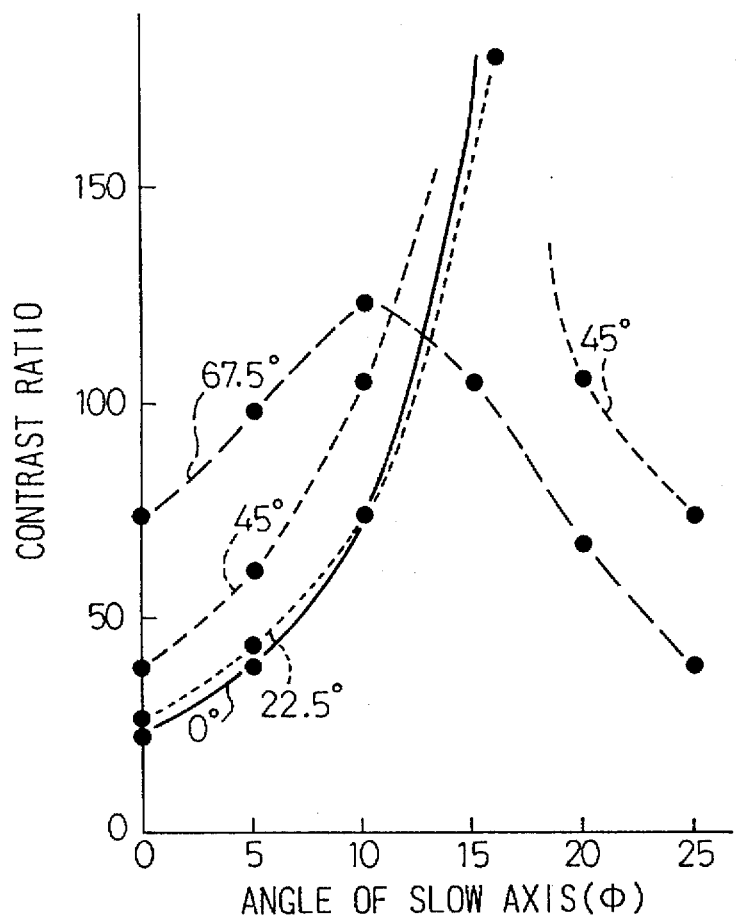
FIG. 25 is a view illustrating the contrast ratio when the twist angle is varied.

FIG. 25 shows the relationship between the setting angle φ of the slow axis Q of the phase film 30 with respect to the transmission axis Po of the analyzer 18, and the contrast ratio. The curves in FIG. 25 are taken for the twist angles of 0, 22.5, 45, and 67.5 degrees. The phase film 30 in this case is a polycarbonate material (PC) with a phase difference of 61 nm. From this Figure, it can be seen that the contrast becomes higher if the slow axis Q of the phase film 30 is set at an angle φ with respect to the transmission axis $P_o$ of analyzer 18. The desirable installation angle φ is in the range from 0 to 45 degrees, and preferably the installation angle φ is in the range from 0 to 25 degrees in this Figure.

Figure 26:
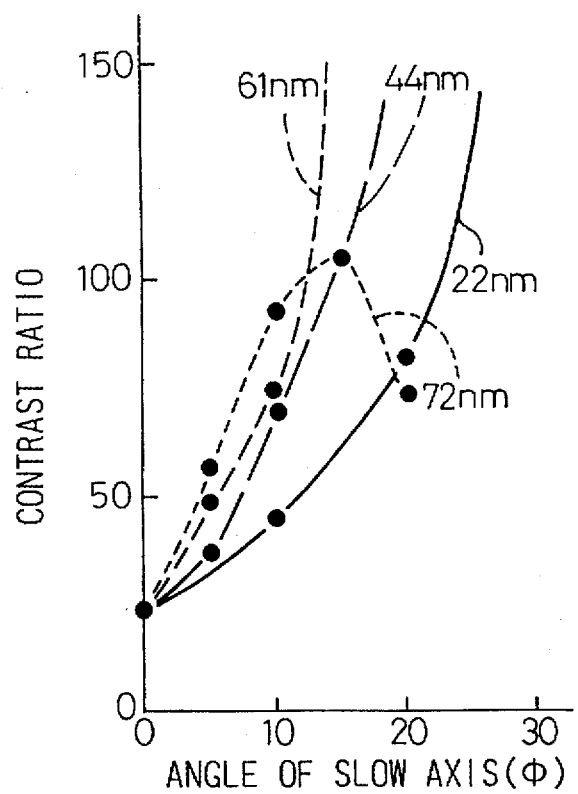
FIG. 26 is a view illustrating the contrast ratio when the twist angle is zero and the retardation of the phase film is varied.

FIG. 26 shows the contrast ratio when the twist angle is 0 degrees and the phase difference of the phase film 30 has the values of 22, 44, 61, and 72 nm. The 61 nm curve in FIG. 26 corresponds to the curve having the twist angle of 0 degree in FIG. 25.

Figure 27:
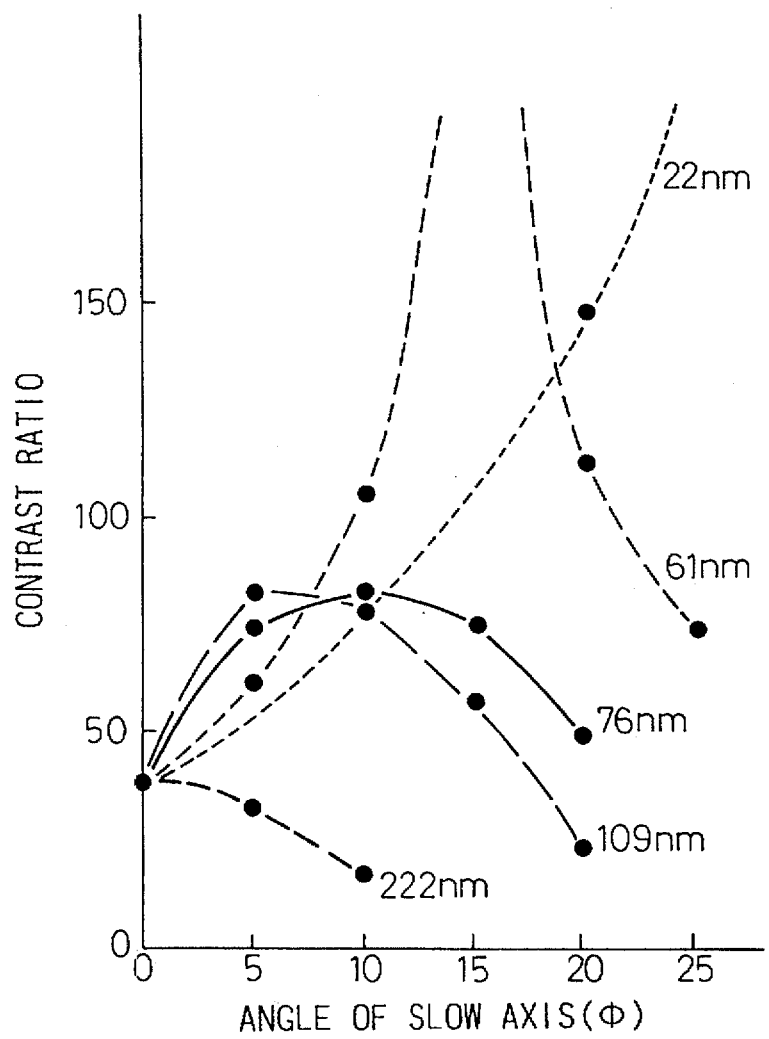
FIG. 27 is a view illustrating the contract ratio when the twist angle is 45 degrees and the retardation of the phase film is varied.

FIG. 27 shows the contrast ratio when the twist angle is 45 degrees and the phase difference of the phase film 30 changes in the values of 22, 44, 61, and 72 nm. The 61 nm curve in FIG. 27 corresponds to the curve having the twist angle of 45 degrees in FIG. 25.

Figure 28:
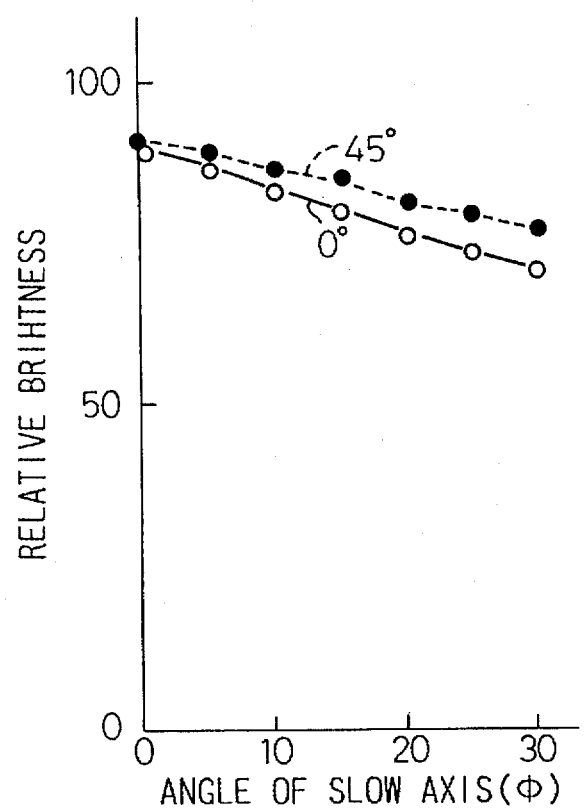
FIG. 28 is a view illustrating the relative brightness when the phase film is inserted.

FIG. 28 shows the results of measurement of the relative brightness, by calculating the percentage of the brightness of the liquid crystal display panel when the phase film 30 is provided relative to the brightness of the liquid crystal display panel when the phase film 30 is not provided. There is no large difference between the curves having the twist angles of 0 and 45 degrees.

Figure 29:
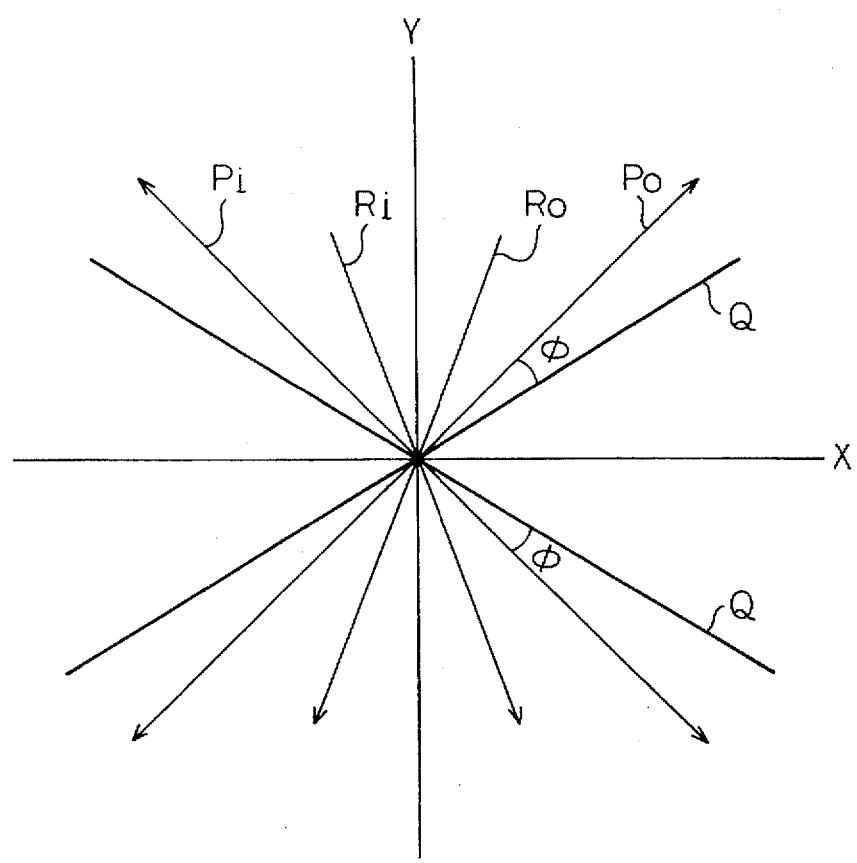
FIG. 29 is a view illustrating a modified example of the second embodiment in which the phase film is inserted.

FIG. 29 shows an example of the liquid crystal display panel in which two phase films 30 are inserted in between the substrate 14 on the outlet side and the analyzer 18. In this case, one phase film 30 is installed at the installation angle φ between the slow axis Q of that phase film 30 and the transmission axis $P_o$ of the analyzer 18, and the other phase film 30 is installed so that the slow axes Q of two phase films 30 are symmetrical about the Y axis. By doing this, it is possible to enhance the symmetry of the panel characteristics. The phase films can be arranged not only on the outlet side but on the light incident side, and it is possible to install as many as four phase films.

Figure 30:
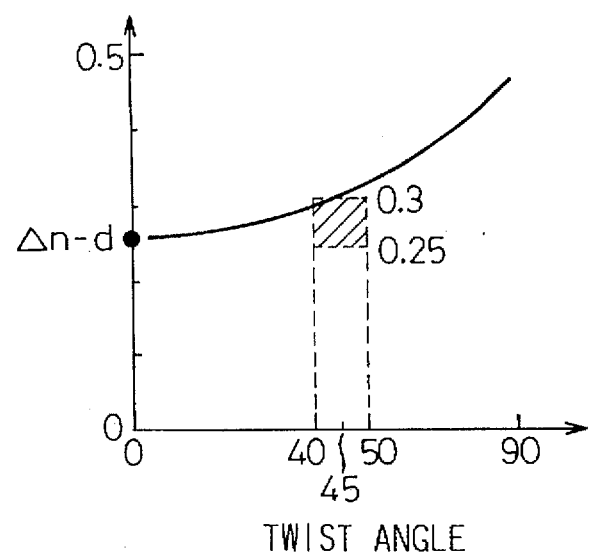
FIG. 30 is a view illustrating the third embodiment of the present invention.

FIG. 30 shows the third embodiment of the present invention. In this embodiment, as in the previous embodiments, the liquid crystal display panel includes a liquid crystal of the twisted nematic type, and an alignment division is carried out. In addition, in this embodiment, the twist angle is set in the range from approximately 40 to 50 degrees, and the product (Δnd) of the anisotropy of the refractive index (Δn) and the layer thickness of the liquid crystal is set in the range from 0.25 to 0.3 μm.

In addition, in the case of the liquid crystal display device having color blue, green, and red pixels, it is preferable that the product (Δnd) of the refractive index anisotropy (Δn) and the layer thickness (d) of the liquid crystal in the blue color pixel is in the range from approximately 0.2 to 0.24 μm, the product (Δnd) of the refractive index anisotropy (Δn) and the layer thickness (d) of the liquid crystal in the green color pixel is in the range from approximately 0.25 to 0.3 μm, and the product (Δnd) of the refractive index anisotropy (Δn) and the layer thickness (d) of the liquid crystal in the red color pixel is in the range from approximately 0.27 to 0.33 μm.

As described above, it is appropriate to select Δnd to be approximately 0.3 μm, when the twist angle is 45 degrees. In this embodiment, the value of Δnd is set to be a value slightly lower than the optimum value. This embodiment strives to solve the problem shown in FIG. 31, in the manner shown in FIG. 32.

Figure 31:
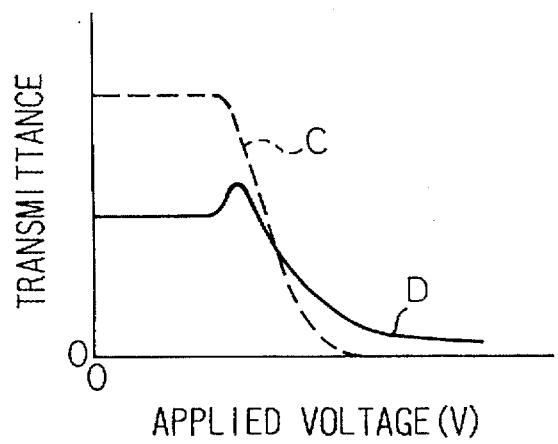
FIG. 31 is a view of the voltage-transmittance curve for explaining a problem in the embodiment of FIG. 30.
Figure 32:
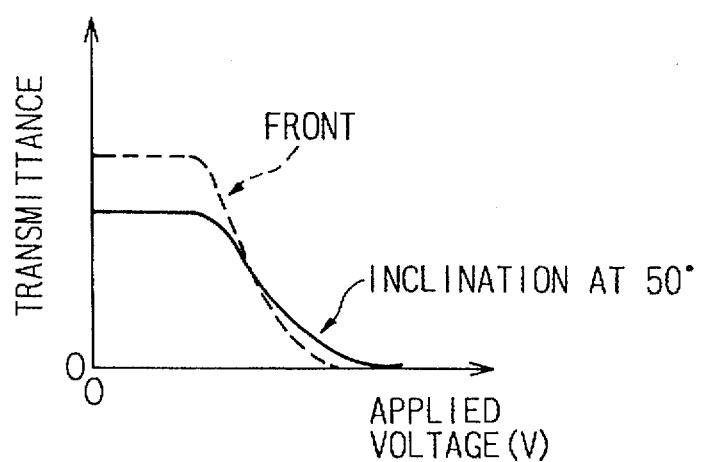
FIG. 32 is a view of the voltage-transmittance curve for explaining an advantage in the embodiment of FIG. 30.

In FIG. 31, the curve C shows the transmittance as seen in the normal direction of the liquid crystal display panel, while the curve E shows the transmittance as seen from in the direction 50 degrees above and below the normal of the liquid crystal display panel. Even if the twist angle is set to a value lower than than 90 degrees and the alignment division is done, brightness reversal tends to occur at a viewing angle greater than, for example, 50 degrees. This is because the twist angle and Δnd are selected so that the brightness is greatest when viewed from the front (i.e., in the normal direction). In this embodiment, to solve this problem, the value of Δnd is made somewhat lower than that optimum value, so that the brightness as seen from the front is somewhat reduced but the problem of the brightness reversal can be eliminated.

Figure 33:
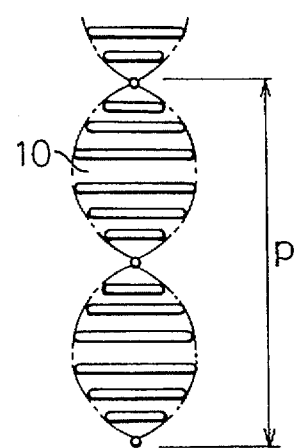
FIG. 33 is a view illustrating the chiral pitch for explaining a further modification.

FIG. 33 shows the chiral pitch "p" of the liquid crystal. A chiral additive is usually mixed in the liquid crystal to aid the twisting, and the chiral pitch "p" is a factor representing the characteristic of the chiral additive which expresses the layer thickness of the liquid crystal necessary for the liquid crystal to rotate 360 degrees. For example, the chiral pitch is 20 μm, when the twist angle is 90 degrees and the layer thickness of the TN liquid crystal 5 μm.

In an example of a variation of the present invention, the twist angle is set in the range from approximately 1 to 60 degrees, and the ratio d/p of the layer thickness "d" of the liquid crystal relative to the chiral pitch "p" of the liquid crystal is set in the range from 0 to minus (−) 1.8. That is, a chiral additive is inserted in the liquid crystal which additive has a characteristic that tends to cause the liquid crystal to rotate in the direction opposite to the direction of the twist of the liquid crystal which is established by the rubbing direction. By doing this, the liquid crystal tends to twist in the direction defined by the rubbing, by the twist angle of, for example, 45 degrees, but the liquid crystal also tends to twist in the opposite direction due to the characteristic of the chiral additive. Since the controlling force produced by the rubbing is stronger than the controlling force produced by the chiral additive in this twist condition, the liquid crystal twists in the direction established by the rubbing. However, because of the provision of the chiral additive acts reversely to the twist direction, it can be said that the liquid crystal is in an unstable twist condition, so that the liquid crystal can easily tilt up when the voltage is applied to the liquid crystal.

In the case where the twist angle is smaller than 90 degrees and Δnd is correspondingly reduced, a problem may arise that the drive voltage of the liquid crystal becomes higher. However, in accordance with this variant example of the present invention, because the liquid crystal twists in a high energy state, it is possible to cause the liquid crystal to tilt up with a relatively low voltage. Therefore, it is possible to reduce the drive voltage.

Figure 34:
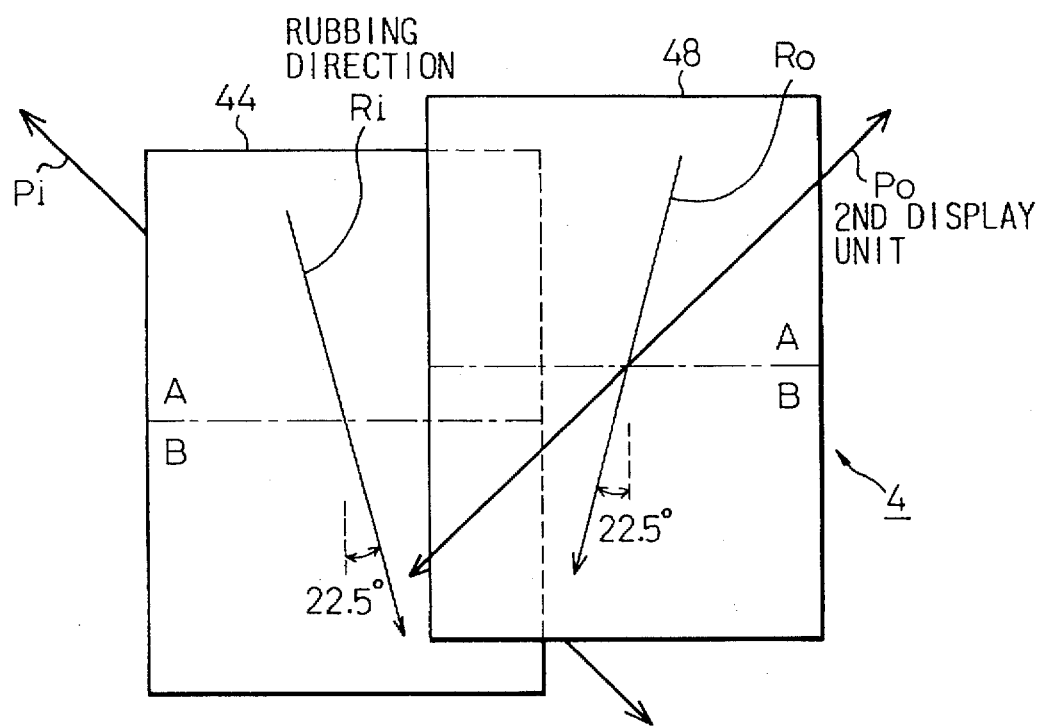
FIG. 34 is a diagrammatic view illustrating the relationship between the rubbing directions and the transmission axes of the polarized light of the liquid crystal display panel according to the fourth embodiment of the present invention.
Figure 35:
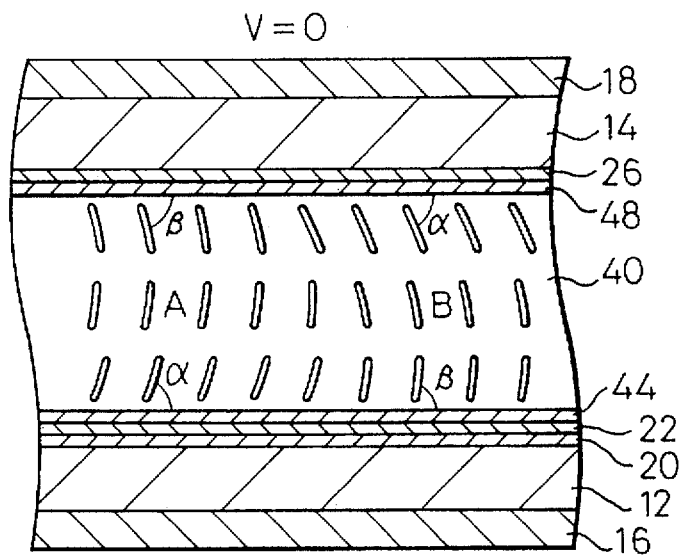
FIG. 35 is a cross-sectional view of the liquid crystal display panel having the alignment arrangement of FIG. 34.
Figure 36:
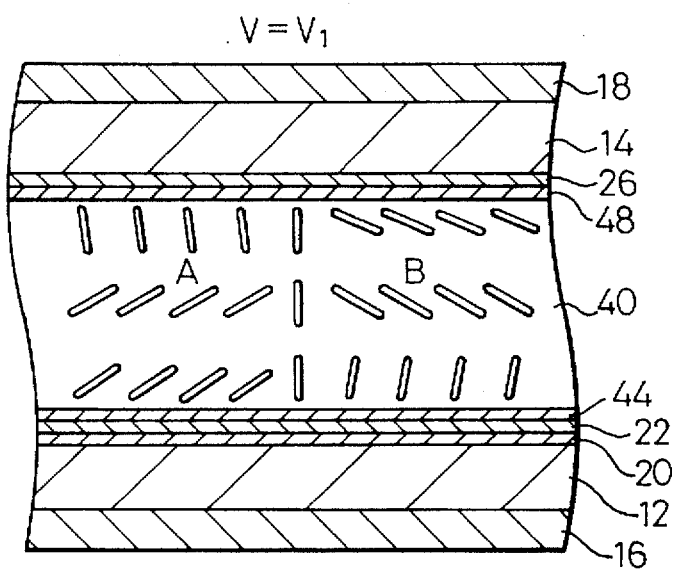
FIG. 36 is a cross-sectional view of the liquid crystal display panel of FIG. 35 when the voltage is applied.

FIGS. 34 to 36 show the fourth embodiment of the present invention. The embodiment of FIGS. 1 and 2 was a liquid crystal display panel including a horizontally aligned liquid crystal 10 which is aligned generally parallel to the substrate surface with a small pretilt angle when the voltage is not applied. The embodiment of FIGS. 34 to 36 is a liquid crystal display panel including a vertically aligned liquid crystal 40 which is aligned generally perpendicular to the substrate surface with a large pretilt angle when the voltage is not applied.

In FIGS. 34 to 36, this liquid crystal display panel comprises a liquid crystal 40 sealingly held between a pair of transparent substrates 12 and 14, and a polarizer 16 and an analyzer 18 on the outside of the substrates 12 and 14. A color filter 20, a transparent electrode 22, and a vertical alignment film 44 are provided on the inside surface of one substrate 12, and a transparent electrode 26 and a vertical alignment film 48 are provided on the inside surface of the other substrate 14.

The vertical alignment films 44 and 48 comprise, for example, JALS-204 films distributed by JRS Corporation, which have a high charge holding characteristics. The liquid crystal 40 comprises, for example, ZLI-2800, distributed by Merk Corporation, which has negative dielectric anisotropy (Δε=−4.8, Δn=0.0437), with a CN chiral additive added to aid the liquid crystal in twisting 90 degrees. Therefore, the liquid crystal molecules are aligned generally perpendicular to the substrate surface when no voltage is applied, as shown in FIG. 35, and the liquid crystal molecules fall toward the substrate surface, and twist in accordance with the rubbing directions and the intrinsic helical structure of the liquid crystal, when a voltage is applied, as shown in FIG. 36.

The vertical alignment films 44 and 46 are treated to provide an alignment division comprising minute domains A and B similar to the alignment division in the alignment films 24 and 28 of FIGS. 1 and 2. That is, in the domain A, the rubbing of the vertical alignment film 44 is done in such a manner that the liquid crystal molecules contacting the vertical alignment film 44 make the pretilt angle α with respect to the substrate surface, and the rubbing of the opposing vertical alignment film 48 is done in a manner that the liquid crystal molecules contacting the vertical alignment film 48 make the pretilt angle β with respect to the substrate surface. Since the vertical alignment films 44 and 48 are provided, the pretilts α and β are close to 90 degrees, and the relationship α<β exists. As a result, the liquid crystal molecules located intermediately between the substrates 12 and 14 tend to fall toward the substrate surface in accordance with the smaller pretilt angle α when the voltage is applied (see FIG. 36). The pretilt α is, for example, 80 degrees and the pretilt β is, for example, 89 degrees.

In the adjacent domain B, opposite to the domain A, the vertifal alignment film 48 is rubbed such that the liquid crystal molecules contacting the vertical alignment film 48 make a pretilt angle α with respect to the substrate surface, and the opposing vertical alignment film 44 is rubbed such that the liquid crystal molecules contacting the vertical alignment film 44 make pretilt angle β with respect to the substrate surface. In this case as well, the pretilts α and β are close to 90 degrees, and the relationship α<β exists. As a result, the liquid crystal molecules located intermediately between the substrates 12 and 14 tend to fall toward the substrate surfaces in accordance with the smaller pretilt angle α (see FIG. 36), when voltage is applied.

Therefore, with regard to the domain A, for example, if the display appears too bright when viewed from above the normal direction, the display appears dark when viewed from below the normal direction. For the domain B, the situation is reversed, and so the display appears dark when viewed from above the normal direction, and the display appears too bright when viewed from below the normal direction. In FIGS. 34 to 36, the minute region corresponding to one pixel is divided into two domains A and B in which the viewing angle characteristics in the domain A is opposite to that in the domain B, and the viewing angle characteristic of the minute region is the average of the viewing angle characteristics of the two domains A and B. Therefore, the viewing angle characteristic is improved.

To carry out the alignment division, each of the vertical alignment films 44 and 48 can be treated or processed in a similar manner applied to the alignment films 24 and 28 of FIG. 1. It is also possible to use processing methods other than those described above in order to provide the alignment division. In this case as well, prior to and subsequent to the rubbing operation of the vertical alignment films 44 and 48, an ultraviolet light can be irradiated to the vertical alignment films 44 and 48 to change the pretilt characteristics of the domain A or the domain B, using a mask having openings corresponding to the domain A or the domain B.

Figure 42:
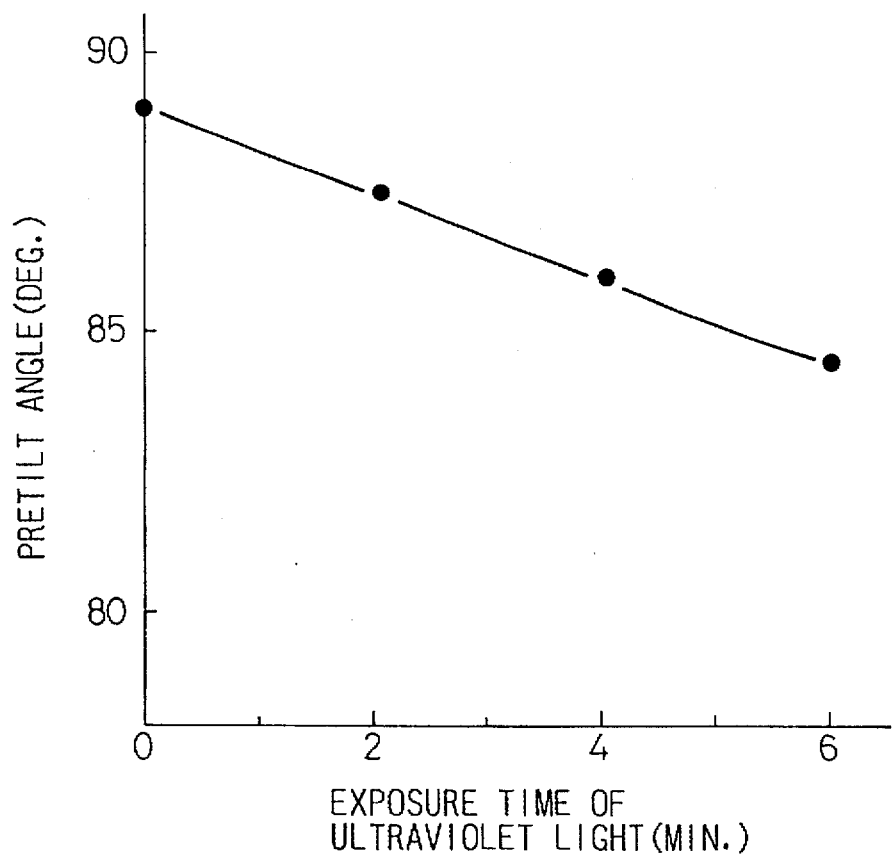
FIG. 42 is a view illustrating the relationship between the exposure time of ultraviolet light and the pretilt angle.

FIG. 42 shows that there is a close relationship between the exposure time of the ultraviolet light and the achieved pretilt angle. It is possible to set the pretilt angles of the domain A and the domain B into desired pretilt angles, by adjusting the exposure time of the ultraviolet light. While it is shown that the pretilt angle decreases with an increase in exposure time of the ultraviolet light in FIG. 42, there are other alignment film materials for which the pretilt angle increases as the exposure time of the ultraviolet light is increased.

In FIG. 34, in the same manner as in Pig. 1, the vertical alignment film 44 on the light incident side substrate 12 is rubbed in the direction of the arrow Ri, and the vertical alignment film 48 on the light output side is rubbed in the direction of the arrow Ro. The rubbing direction Ri and the rubbing direction Ro form an angle of 45 degrees between them, so that the twist angle of liquid crystal 40 is 45 degrees. The transmission axis of the polarizer 16 is indicated by the arrow Pi, and the transmission axis of the analyzer 18 is indicated by the arrow Po. The transmission axis Pi of the polarizer 16 and the transmission axis Po of the analyzer 18 are arranged at an angle of 45 degrees with respect to the horizontal. The transmission axis Pi of the polarizer 16 and the transmission axis Po of the analyzer 18 are arranged perpendicular or parallel to each other. In addition, it is needless to say that the alignment division can be performed by using the multi-rubbing method so that partial openings are provided in the alignment film and the rubbing is carried out.

In this manner, a vertically aligned liquid crystal display panel is formed, which has the alignment division effected thereto, and in which the twist angle is less than 90 degrees and the linearly polarized light incident to the liquid crystal is output after twisting 90 degrees. This vertically aligned liquid crystal display panel also provides a higher contrast and a superior viewing angle characteristic.

Figure 37:
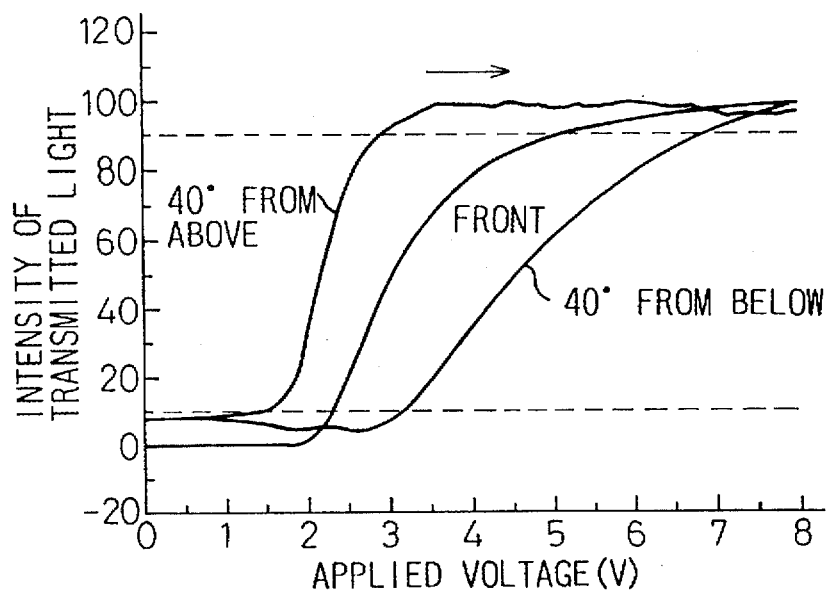
FIG. 37 is a view illustrating the viewing angle characteristics of the liquid crystal display panel when viewed at several angles from above and from below, in which the twist angle is 10 degrees and the alignment division is not carried out.

FIG. 37 shows the viewing angle characteristic viewed in the directions from above and from below the normal of the liquid crystal display panel in which the twist angle is 10 degrees and no alignment division is provided.

Figure 38:
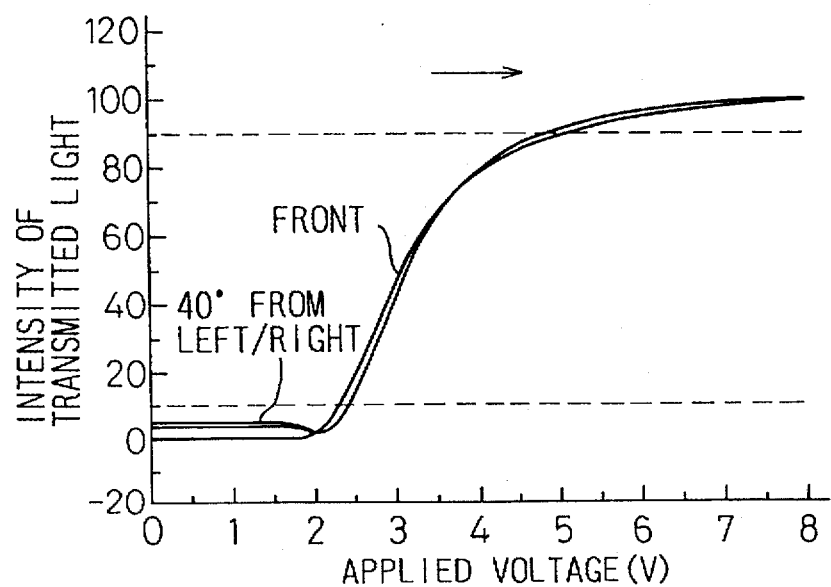
FIG. 38 is a view illustrating the viewing angle characteristics of the liquid crystal display panel when viewed at several angles from left and from right, in which the twist angle is 10 degrees and the alignment division is not carried out.

FIG. 38 shows the viewing angle characteristics viewed in the directions from the left and the right relative to the normal of the liquid crystal display panel in which the twist angle is 10 degrees and no alignment division is provided.

Figure 39:
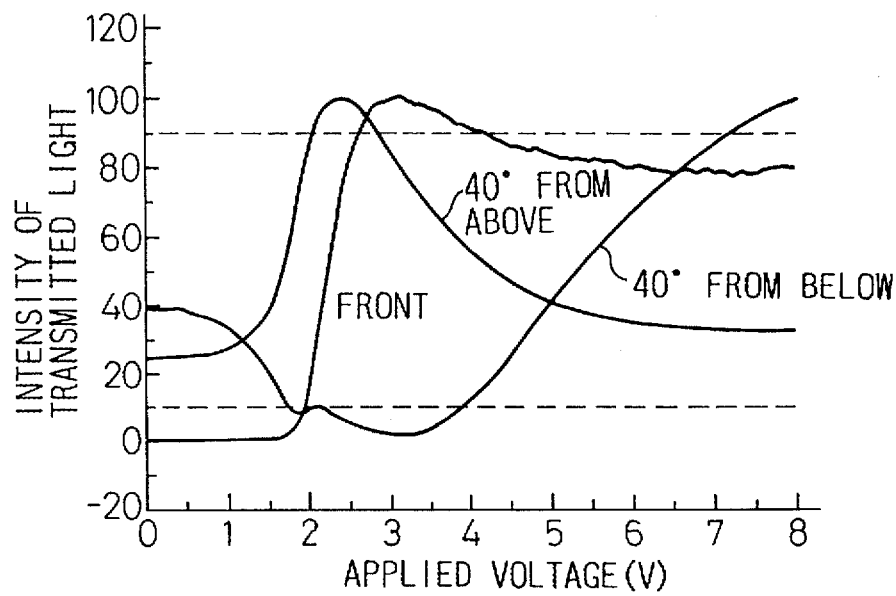
FIG. 39 is a view illustrating the viewing angle characteristics of the liquid crystal display panel when viewed at several angles from above and from below, in which the twist angle is 90 degrees and the alignment division is not carried out.

FIG. 39 shows the viewing angle characteristics viewed in the directions from above and from below the normal of the liquid crystal display panel in which the twist angle is 90 degrees and no alignment division is provided.

Figure 40:
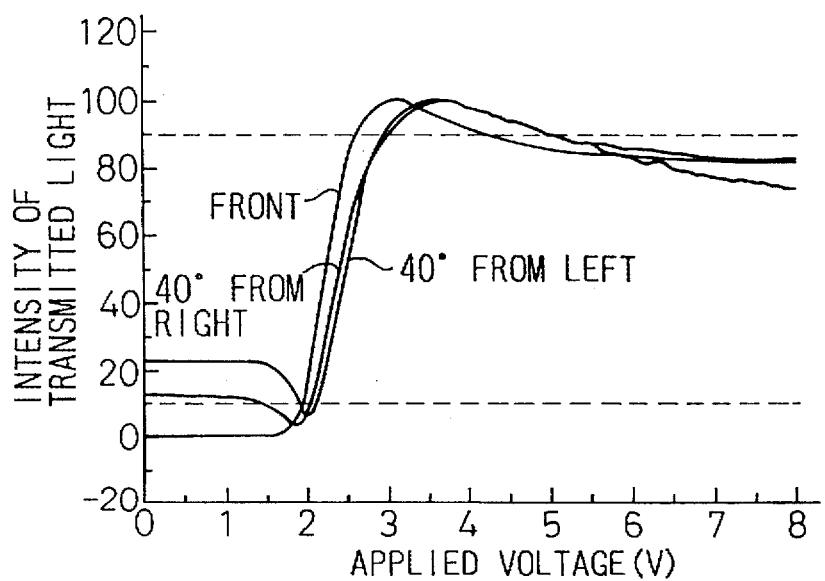
FIG. 40 is a view illustrating the viewing angle characteristics of the liquid crystal display panel when viewed at several angles from left and from right, in which the twist angle is 90 degrees and the alignment division is not carried out.

FIG. 40 shows the viewing angle characteristics viewed in the directions from the left and the right relative to the normal of the liquid crystal display panel in which the twist angle is 90 degrees and no alignment division is provided.

In this manner, in the liquid crystal display panel with the twist angle of 90 degrees and no alignment division, the viewing angle characteristics exhibit a large difference between the viewing angles from above and from below. If the twist angle is made less than 90 but no alignment division is effected to the liquid crystal display panel, it is not possible to achieve satisfactory viewing angle characteristics in the vertical and horizontal directions.

Figure 41:
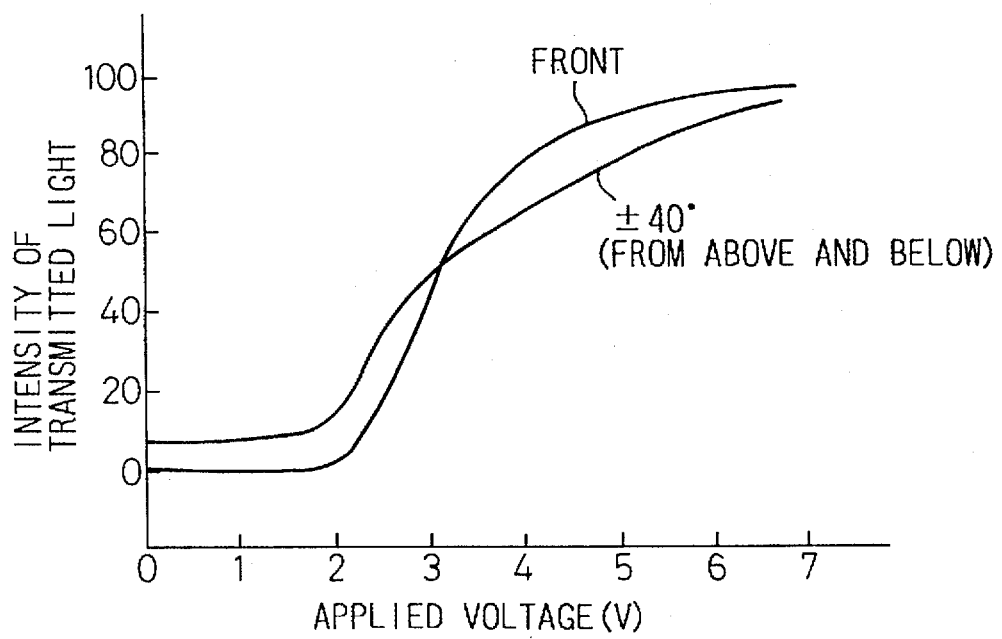
FIG. 41 is a view illustrating the viewing angle characteristics of the liquid crystal display panel when viewed at several angles from above and from below, in which the twist angle is 10 degrees and the alignment division is carried out.

FIG. 41 shows the viewing angle characteristics viewed from above and from below the normal of the liquid crystal display panel in which the twist angle is 10 degrees and the alignment division is provided. It can be seen that this viewing angle characteristic is considerably improved in comparison with the viewing angle characteristics of FIG. 39.

As explained above, according to the present invention, it is possible to provide a liquid crystal display panel in which brightness reversal in the voltage-transmittance characteristic curve is eliminated, the transmittance changes smoothly in proportion to the applied voltage, the contrast is higher, and the viewing angle characteristics is superior, and which can be used for a high quality gray scale display.

We claim:

1. A liquid crystal display panel comprising:

a pair of substrates having alignment films, respectively;

a liquid crystal held between said pair of substrates, the liquid crystal having a layer thickness (d) and an anisotropy of the refractive index (Δn);

a polarizer and an analyzer arranged outside said substrates, respectively;

the alignment films of said pair of substrates being held in such an alignment that liquid crystal molecules twist from one substrate to the other substrate through a predetermined twist angle and the alignment films are divided into minute regions (A and B) so that when a voltage is applied to said liquid crystal, liquid crystal molecules located intermediately between said substrates in one of the regions are tilted with respect to one of the substrates toward one direction and liquid crystal molecules located intermediately between said substrates in other region are tilted with respect to said one of the substrates toward a direction opposite to said one direction, said liquid crystal molecules in said other region;

the twist angle of the liquid crystal being greater than zero but less than 90 degrees; and the product (Δnd) of the anisotropy of the refractive index (Δn) and the layer thickness (d) of the liquid crystal being greater than 0 μm and less than approximately 0.5 μm and ensuring that a linearly polarized light incident onto the liquid crystal rotates approximately 90 degrees before the light emerges from the liquid crystal.

2. A liquid crystal display panel according to claim 1, wherein said polarizer and said analyzer have respective transmission axes which are perpendicular or parallel to each other.

3. A liquid crystal display panel according to claim 1, wherein said liquid crystal molecules comprise horizontally aligned liquid crystal molecules which are aligned substantially parallel to the surface of said substrate when no voltage is applied to the liquid crystal.

4. A liquid crystal display panel according to claim 1, wherein the twist angle of the liquid crystal molecules is in the range from approximately 10 to 0 degrees.

5. A liquid crystal display panel according to claim 4, wherein the twist angle of the liquid crystal molecules is in the range from approximately 10 to 0 degrees.

6. A liquid crystal display panel according to claim 5, wherein the twist angle of the liquid crystal molecules is selected to be approximately 45 degrees, and the product (Δnd) is approximately 0.3 μm.

7. A liquid crystal display panel according to claim 1, wherein the anisotropy of the refractive index (Δn) of the liquid crystal is in the range from 0.05 to 0.1.

8. A liquid crystal display panel according to claim 1, wherein the twist angle of the liquid crystal molecules is in the range from approximately 40 to 50 degrees, and the product ,red is in the range from approximately 0.2 to 0.33 μm.

9. A liquid crystal display panel according to claim 8, further comprising blue, green, and red color pixels, the product (Δnd) of the anisotropy (Δn) of the refractive index and the layer thickness (d) of the liquid crystal for the blue color pixels being in the range from approximately 0.2 to 0.24 μm, the product (Δnd) of the anisotropy (Δn) of the refractive index and the layer thickness (d) of the liquid crystal for the green color pixels being in the range from approximately 0.25 to 0.3 μm, and the product (Δnd) of the anisotropy (Δn) of the refractive index and the layer thickness (d) of the liquid crystal for the red color pixels being in the range from approximately 0.27 to 0.33 μm.

10. A liquid crystal display panel according to claim 1, wherein the twist angle of the liquid crystal molecules is in the range from approximately 1 to 60 degrees, and wherein the ratio (d/p) of the layer thickness (d) of the liquid crystal to the chiral pitch (p) of the liquid crystal molecule is in the range from 0 to −1.8.

11. A liquid crystal display panel according to claim 1, wherein said liquid crystal is a vertically aligned liquid crystal in which liquid crystal molecules are aligned substantially perpendicular to the surface of said substrate when no voltage is applied.

12. A liquid crystal display panel according to claim 1, further comprising blue, green, and red color pixels, and a gap thickness between said substrates, the gap thickness changing for every color pixel.

13. A liquid crystal display panel according to claim 1, wherein a phase film is inserted at least between an output substrate of the pair of substrates and an analyzer.

14. A liquid crystal display panel according to claim 13, wherein said phase film is a uniaxial film and is arranged so that the retarding axis of said phase film is at an angle to the transmission axis of said analyzer.

15. A liquid crystal display panel according to claim 14, wherein the retardation (Δnd) of said phase film is less than 100 nm and the retarding axis of said phase film is in the range of 0 to 45 degrees from the transmission axis of said analyzer.

16. A liquid crystal display panel according to claim 1, wherein a driving voltage for said liquid crystal is higher than a driving voltage for a 90° twist conventional TN liquid crystal.

\* \* \* \* \*

UNITED STATES PATENT AND TRADEMARK OFFICE
CERTIFICATE OF CORRECTION

PATENT NO. : 5,745,206
DATED : April 28, 1998
INVENTOR(S) : Koike et al.

It is certified that error appears in the above-identified patent and that said Letters Patent is hereby corrected as shown below:

Column 2, line 50, delete "problems" and insert --problem in-- therefor

Column 3, line 9, delete "refracted" and insert --refractive-- therefor

Column 4, line 22, delete "10"

Column 6, line 23, delete "B" and insert --β-- therefor

Column 6, line 59, before "Therefore" start a new paragraph

Column 8, line 19, delete "B" and insert --β-- therefor

UNITED STATES PATENT AND TRADEMARK OFFICE
CERTIFICATE OF CORRECTION

PATENT NO. : 5,745,206
DATED : April 28, 1998
INVENTOR(S) : Koike et al.

It is certified that error appears in the above-identified patent and that said Letters Patent is hereby corrected as shown below:

Column 9, line 32, delete "5"

Column 15, line 36, delete "E" and insert

--D-- therefor

Column 17, line 54, delete "Pig." and insert

--Fig.-- therefor

Column 17, line 60, delete "40" and insert

--40-- (bold) therefor

Column 19, line 4, after "in" insert --the--

Column 19, line 6, after "direction," insert

--such that--

UNITED STATES PATENT AND TRADEMARK OFFICE
CERTIFICATE OF CORRECTION

PATENT NO. : 5,745,206
DATED : April 28, 1998
INVENTOR(S) : Koike et al.

It is certified that error appears in the above-identified patent and that said Letters Patent is hereby corrected as shown below:

Column 19, line 6, after "in said" insert

--one region have an opposite inclination from said liquid crystal molecules--

Column 19, line 27, delete "0 degrees" and insert --60 degrees-- therefor

Column 19, line 30, delete "0 degrees" and insert --50 degrees-- therefor

Column 19, line 41, delete ", red" and insert --And-- therefor.

Signed and Sealed this

Twenty-second Day of September, 1998

Attest:

BRUCE LEHMAN

*Attesting Officer*   *Commissioner of Patents and Trademarks*